US009002005B2

(12) United States Patent
Lejeune et al.

(10) Patent No.: US 9,002,005 B2
(45) Date of Patent: *Apr. 7, 2015

(54) ON-DEMAND SWITCHED CONTENT ENCRYPTION

(71) Applicant: Sony Corporation, Tokyo (JP)

(72) Inventors: Stephane Lejeune, San Diego, CA (US); Brant L. Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,983

(22) Filed: Jan. 17, 2014

(65) Prior Publication Data

US 2014/0137150 A1 May 15, 2014

Related U.S. Application Data

(63) Continuation of application No. 12/979,564, filed on Dec. 28, 2010, now Pat. No. 8,649,514.

(51) Int. Cl.
*H04N 7/14* (2006.01)
*H04N 21/2347* (2011.01)
(Continued)

(52) U.S. Cl.
CPC ..... *H04N 21/2347* (2013.01); *H04N 21/23476* (2013.01); *H04N 21/25833* (2013.01);
(Continued)

(58) Field of Classification Search
CPC .......... H04N 21/47202; H04N 21/2347; H04N 7/173; H04L 29/06176; H04L 29/06462; H04H 20/38; G06F 17/30017
USPC ............... 380/201, 241, 242; 725/31, 96, 151
See application file for complete search history.

(56) References Cited

U.S. PATENT DOCUMENTS 7,263,187 B2    8/2007   Pedlow et al.
7,336,787 B2    2/2008   Unger et al.
(Continued)

FOREIGN PATENT DOCUMENTS

CN    1633809     6/2005
CN    101019428   8/2007
(Continued)

OTHER PUBLICATIONS

Chinese Office Action for related Chinese application 201110319348.3 dated Jan. 24, 2014.
(Continued)

*Primary Examiner* — Eleni Shiferaw
*Assistant Examiner* — Paul Callahan
(74) *Attorney, Agent, or Firm* — Miller Patent Services; Jerry A. Miller

(57) ABSTRACT

A number of encryption system types utilized by subscriber terminal devices currently requesting tuning to a particular switched digital video (SDV) content selection is determined in response to each change in a number of the subscriber terminals requesting tuning to the particular SDV content selection. SDV content associated with the particular SDV content selection is encrypted as either encrypted SDV content or multiply partially encrypted SDV content based upon the determined number of encryption system types beginning from a current play location indicated for the SDV content selection within an electronic program guide (EPG). Either the encrypted SDV content or the multiply partially encrypted SDV content is distributed as part of an outgoing SDV content stream to the subscriber terminals currently requesting tuning to the particular SDV content selection.

25 Claims, 9 Drawing Sheets

(51) Int. Cl.
*H04N 21/258* (2011.01)
*H04N 21/266* (2011.01)
*H04N 21/61* (2011.01)
*H04N 21/658* (2011.01)
*H04N 21/472* (2011.01)

(52) U.S. Cl.
CPC ......... *H04N21/266* (2013.01); *H04N 21/6118* (2013.01); *H04N 21/6581* (2013.01); *H04N 21/47202* (2013.01)

(56) References Cited

U.S. PATENT DOCUMENTS

| | | |
|---|---|---|
| 7,590,237 B2 | 9/2009 | Krause et al. |
| 7,620,180 B2 | 11/2009 | Pedlow et al. |
| 7,814,525 B2 | 10/2010 | Pedlow et al. |
| 2005/0097596 A1 | 5/2005 | Pedlow |
| 2005/0097598 A1 | 5/2005 | Pedlow et al. |
| 2009/0222872 A1 | 9/2009 | Schlack |

FOREIGN PATENT DOCUMENTS

| | | |
|---|---|---|
| WO | WO 2005/022796 | 3/2005 |
| WO | WO 2005/022892 | 3/2005 |

OTHER PUBLICATIONS

Non-Final Office Action, U.S. Appl. No. 12/979,564, filed Jul. 16, 2013.

Notice of Allowance, U.S. Appl. No. 12/979,564, filed Oct. 7, 2013.

ON-DEMAND SWITCHED CONTENT ENCRYPTION

CROSS REFERENCE TO RELATED DOCUMENTS

This application is a continuation of U.S. patent application Ser. No. 12/979,564 filed Dec. 28, 2010, now U.S. Pat. No. 8,649,514. This application is related to U.S. patent application Ser. No. 11/701,693 titled "NAVIGATION WITHIN SWITCHED DIGITAL STREAMED CONTENT," which was filed in the United States Patent Office on Feb. 2, 2007, now issued as U.S. Pat. No. 7,814,525, and is also related to U.S. Pat. No. 7,263,187 titled "BATCH MODE SESSION-BASED ENCRYPTION OF VIDEO ON DEMAND CONTENT," which was filed in the United States Patent Office on Apr. 21, 2004, both of which are hereby incorporated by reference in their entirety as if fully set forth herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Switched digital video (SDV) is a form of a cable audio and video content distribution system. Broadcasting of channels that are not being viewed may be stopped and not continuously broadcasted. When a set top box (STB) requests a channel, that channel and its contents are switched to the STB.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
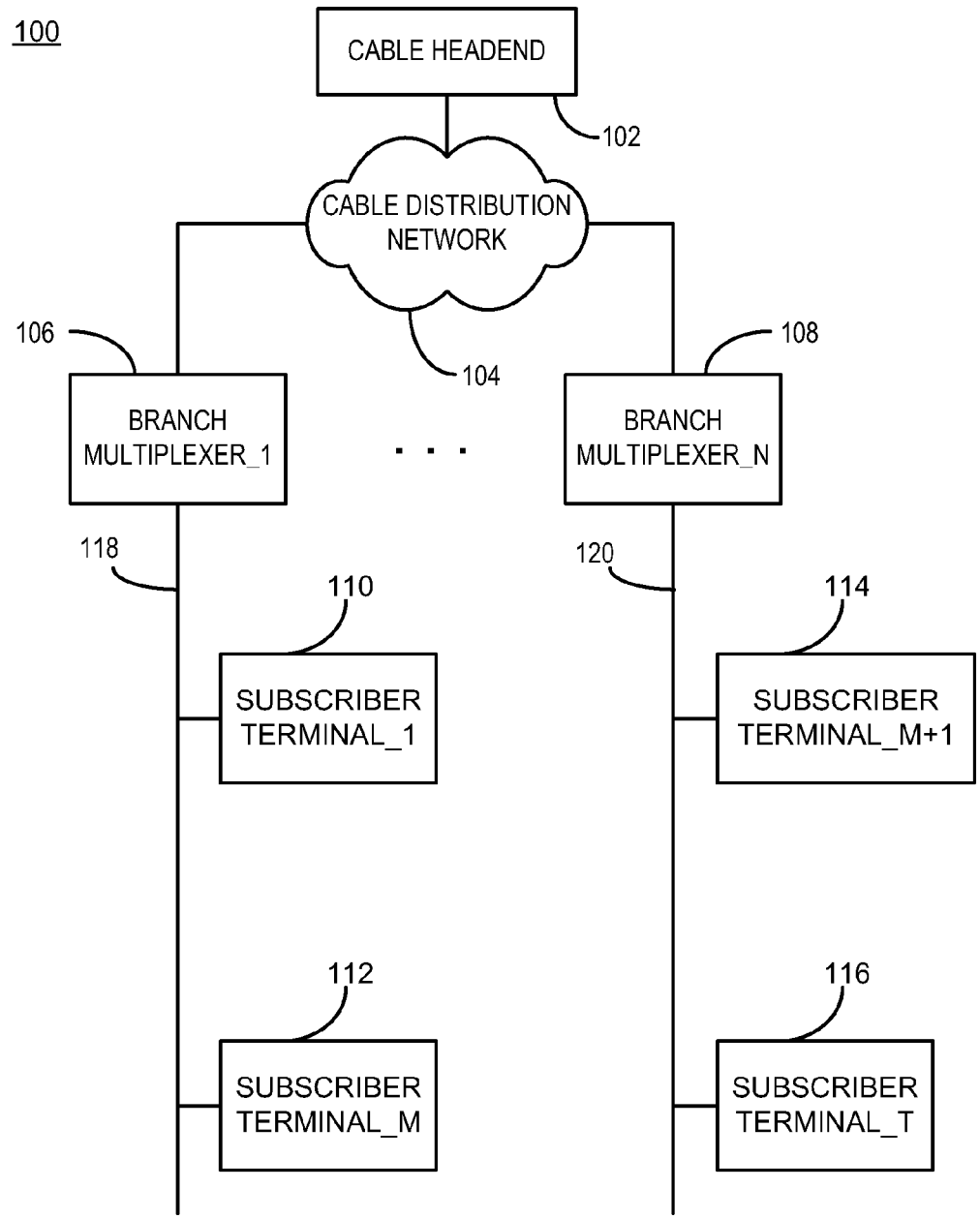
FIG. 1 is a block diagram an example of an implementation of a switched digital video (SDV) system capable of providing on-demand switched multiple partial content encryption consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

ACRONYMS, ABBREVIATIONS AND DEFINITIONS

ASI—Asynchronous Serial Interface
CA—Conditional Access
CAT—Conditional Access Table
CASID—Conditional Access System Identifier
CPE—Customer Premises Equipment
DRM—Digital Rights Management
ECM—Entitlement Control Message
EMM—Entitlement Management Message
EPG—Electronic Program Guide
GOP—Group of Pictures (MPEG)
MPEG—Moving Pictures Experts Group
MSO—Multiple System Operator
NIT—Network Information Table
OLES—Off Line Encryption System
PAT—Program Allocation Table
PID—Packet Identifier
PMT—Program Map Table
PSI—Program Specific Information
QAM—Quadrature Amplitude Modulation
RAID—Redundant Array of Independent Disks
RAM—Random Access Memory
SAN—Storage Area Network
VOD—Video on Demand Critical Packet—a packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet," but when subjected to normal decoding, the inability to fully or properly decode such a "critical packet" would inhibit normal viewing or listening of the program content.

Selective Encryption (or Partial Encryption)—encryption of only a portion of an elementary stream in order to render the stream difficult or impossible to use (i.e., view or hear).

Multiple Selective Encryption—encryption of portions of a single selection of content under two or more separate encryption systems.

Passage®—Registered Trademark of Sony Electronics Inc. for various single and multiple selective encryption systems, devices and processes.

Trick mode—an operational mode of playback of digital content to simulate fast forward, rewind, pause, suspend (stop), slow motion, etc. operations as in a video tape system.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments of VOD disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The Passage® initiative (Passage is a registered trademark of Sony Electronics Inc.), promoted by Sony, provides a mechanism for Multiple Service Operators (MSOs) to deploy non-legacy headend equipment, subscriber devices and services on their existing legacy networks. In the United States, these networks are most commonly supplied by either Motorola (formerly General Instrument) or Cisco (formally Scientific Atlanta). These two companies at present constitute better than a 99% share of the US cable system market as turnkey system providers. The systems, by design, employ proprietary technology and interfaces precluding the introduction of non-incumbent equipment into the network. An MSO, once choosing one of these suppliers during conversion from an analog cable system to a digital cable system, faces a virtual monopoly when seeking suppliers for additional equipment as their subscriber base or service offering grows.

Before the Passage® initiative, the only exit from this situation was to forfeit the considerable capital investment already made with the incumbent provider, due to the intentional incompatibility of equipment between the incumbent and other sources. One primary barrier to interoperability is in the area of conditional access systems, the heart of addressable subscriber management and revenue collection resources in a modern digital cable network.

The Passage® system technologies were developed to allow the independent coexistence of two or more conditional access systems on a single, common plant. Unlike other attempts to address the issue, the two systems operate with a common transport stream without any direct or indirect interaction between the conditional access systems. The basic processes used in these technologies are discussed in detail in the above-referenced pending patent applications.

The above-referenced commonly owned patent applications, and others, describe inventions relating to various aspects of methods generally referred to herein as partial encryption or selective encryption, consistent with certain aspects of Passage®. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is consumed to effectively encrypt the content using multiple encryption systems. This results in a cable or satellite system being able to utilize set-top boxes (STB) or other implementations of conditional access (CA) receivers from multiple manufacturers in a single system, and thus freeing the cable or satellite company to competitively shop for providers of set-top boxes.

In each of these disclosures, the clear content is identified using a primary Packet Identifier (PID). A secondary PID (or shadow PID) is also assigned to the program content. Selected portions of the content are encrypted under two (or more) encryption systems and the encrypted content is transmitted using both the primary and secondary PIDs (one PID or set of PIDs for each encryption system). The so-called legacy STBs operate in a normal manner decrypting encrypted packets arriving under the primary PID and ignoring secondary PIDs. The newer (non-legacy) STBs operate by associating both the primary and secondary PIDs with a single program. Packets with a primary PID are decoded normally and packets with a secondary PID are first decrypted then decoded. The packets associated with both PIDs are then assembled together to make up a single program stream. The PID values associated with the packets are generally remapped to a single PID value for decoding (shadow PIDs remapped to the primary PID value or vice versa.)

The present subject matter provides automated on-demand switched content encryption. The automated on-demand switched content encryption provides bandwidth-efficient download of streams of switched video on demand content for various encryption platforms. Cable systems use switched digital video (SDV) to provision streams of audio and/or video (A/V) content "on the fly" (i.e., dynamically as needed) as viewers select channels from the electronic program guide (EPG). A set-top box sends a provisioning request via a back channel to the headend system and the channel is provisioned in response to the request. The headend encrypts critical content on the fly for devices requiring different digital rights management (DRM) or conditional access (CA) encryption. If no devices that require a specific DRM or CA, that is different from the original DRM or CA, are requesting content or tuned to a particular program, then encrypted packets for the specific DRM or CA are dropped from the streamed data, thereby saving bandwidth. Further, where a single subscriber terminal that uses a single DRM or CA is tuned to a channel/content selection, the content selection may be fully or partially encrypted using the single DRM or CA associated with that tuned subscriber terminal to further decrease bandwidth. When a second subscriber terminal requests the content selection, the headend may determine whether a new/second DRM or CA is used by the second subscriber terminal. If a new/second DRM or CA is used by the second subscriber terminal, the headend coordinates a transition from full or single partial encryption (also singular partial encryption hereinafter) of the video stream for the selected content for the first DRM or CA to multiple partial encryption of the video stream for the selected content. The terms "encryptions system" and "encryption systems" may be used herein to refer to the respective DRM or CA associated with one or more subscriber terminal devices. The transition to multiple partial encryption conserves bandwidth for the switched digital video stream. This conserved bandwidth may be used for data services or other purposes.

As such, the present subject matter saves bandwidth in a variety of ways while supporting multiple partial encryption for various DRMs and CAs at the same time within the context of a switched digital video environment. The content is delivered multiply partially encrypted on demand based upon subscriber terminal encryption types of subscriber terminals tuned to a given content item. For example, where multiple subscribers utilize different encryption systems, the content is delivered multiply partially encrypted on demand. Alternatively, the content may be one hundred percent (100%) encrypted or single partially encrypted if only one subscriber terminal encryption type associated with one or more subscriber terminals is tuned to a particular channel/content selection, to reduce processing and bandwidth overhead for partial encryption. As such, a given item of content may be partially encrypted using one or more encryption protocols based upon an encryption protocol or encryption system type associated with each of one or more subscriber terminals tuning to the content item. Current approaches require entire duplication of streams and files where multiple encryption system types are requesting a content selection. One possible improvement would be to always switch multiple partially encrypted content. However, the present subject matter provides content that may be switched as needed/requested by subscribers between single partial encryption or full single encryption, and multiple partial encryption.

It should be noted that SDV differs from video on demand (VOD) in that the channel is switched into the transport stream at its current play time for SDV rather than from a beginning of the respective video stream as for VOD. As such, additional coordination is used at the headend to locate a current play location (e.g., current play time) and to begin encryption and streaming activities for the requested channel. Additionally, certain channels may form a portion of a basic tier of service or certain subscriber terminals may be one-way devices (i.e., no back channel to the headend). For these situations, video streams may not be switched or may be multiply partially encrypted based upon the subscriber terminals configured for a given sub-network. Alternatively, some channels may be switched depending upon demand. Additionally, some channels may always get switched (e.g., channels that a given viewer may typically not choose to view, etc.), such that if subscriber terminals are not parked on a given channel or are surfing through channels, then there may not be a need to stream video content for the given channel. As such, switched digital video systems provide for reclamation of bandwidth for data traffic and other purposes.

For purposes of the present description, content portions that may be selectively (partially) multiple encrypted for automated on-demand switched content encryption may be considered "critical" packets, as described above, and may include, for example, parallel program specific information (PSI), duplicate program allocation table (PAT), duplicate program map table (PMT), and duplicate network information table (NIT). Additionally, conditional access (CA) packets associated with a conditional access table (CAT), entitlement management message (EMM), entitlement control message (ECM), or other CA information may also be partially multiply encrypted for automated on-demand switched content encryption. Other fields are possible for multiple partial encryption for automated on-demand switched content encryption and all are considered within the scope of the present subject matter.

Turning now to FIG. 1, FIG. 1 is a block diagram an example of an implementation of a switched digital video (SDV) system 100 capable of providing on-demand switched multiple partial content encryption. A cable headend 102 is shown connected to a cable distribution network 104. The headend 102 performs the on-demand switched multiple partial content encryption described herein. Content distribution carried out in the cable distribution network 104 is divided into geographic regions, each of which may be handled by its own branch multiplexer or other distribution device, such as the branch multiplexer_1 106 through the branch multiplexer_N 108. Each branch multiplexer may be viewed as a cable headend in and of itself in that the various subscriber terminals view the branch multiplexer as a cable headend. Within FIG. 1, a subscriber terminal_1 110 through a subscriber terminal_M 112 and a subscriber terminal_M+1 114 through a subscriber terminal_T 116, are shown connected via a cable network 118 and 120, respectively, to the cable distribution network 104. The branch multiplexer_1 106 through the branch multiplexer_N 108 and the cable system headend 102 may be considered sources for content or headends for purposes of this document, and the source functions may be carried out at either place or both places without limitation. The subscriber terminal_1 110 through the subscriber terminal_T 116 may be one-way unidirectional digital cable receivers (UDCRs) or two-way interactive digital cable receivers (iDCRs) devices, or may be an enhanced one-way (UDCR+) receiver devices such as described herein. However, it is understood that a back channel to the headend 102 via two-way devices provides tuning request information used by the headend 102 for switched digital video encryption (SDV) decisions, though static information may be maintained for one-way devices without departure from the scope of the present subject matter.

In a switched digital cable environment, each branch of the cable network 118 and 120 may be transmitting different content depending upon the demands of the various subscriber terminals 110 through 116 respectively. It should be noted that the term subscriber terminal or television receiver device is used to embrace any receiver device, such as a set top box (STB), set back box, or other television receiver device including a television set itself, that is compatible with the cable distribution network 104. If any particular subscriber terminal 110 through 116 is an interactive digital cable receiver (iDCR), then it may be utilized to readily control the content provided by the headend 102 via the branch multiplexer_1 106 through the branch multiplexer_N 108, respectively. However, a conventional unidirectional digital cable receiver (UDCR) device is only able to receive content that it is statically configured to receive, and content that is designated as switched digital content is generally unavailable to a UDCR.

Figure 2:
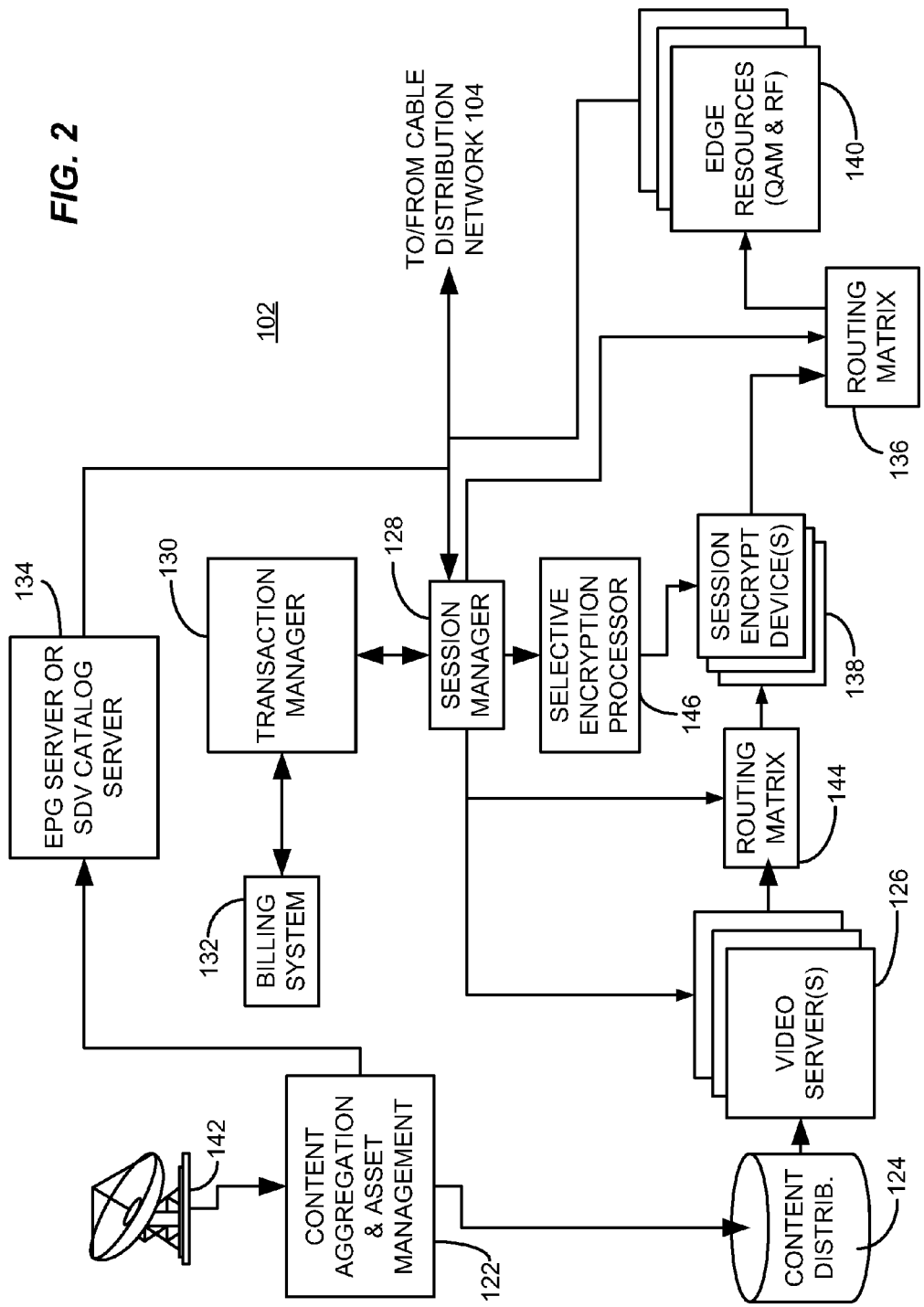
FIG. 2 is a block diagram an example of an implementation the headend of FIG. 1 consistent with certain embodiments of the present invention.

FIG. 2 is a block diagram an example of an implementation the headend 102 of FIG. 1. The headend 102 includes a content aggregation and asset management device 122, a content distribution storage area network (SAN) 124, one or more video server(s) 126, a session manager 128, a transaction manager 130, a billing system 132, an EPG server or SDV catalog server 134, a transport router/switch fabric (routing matrix) 136, one or more session encryption device(s) 138, and a quadrature amplitude modulation (QAM) modulators/upconverters and other edge resources 140. The headend 102 provides programming to the subscriber terminals 110 through 116 for ultimate viewing and listening on a TV set or other monitor device (not shown).

In operation, content is received from various sources including, but not limited to, satellite broadcasts received via one or more satellite dishes 142. It is understood that the one or more satellite dishes 142 are not a part of the headend 102 but are shown within FIG. 2 for clarity. Content is aggregated at the content aggregation and asset management device 122 and cataloged at EPG server or SDV catalog server 134. Content is then distributed at the content distribution SAN 124 to one or more video server(s) 126. When a subscriber terminal, such as one of the subscriber terminals 110 through 116, tunes to a content selection, a message is sent via a back channel from the respective subscriber terminal (e.g., STB) to the session manager 128. The session manager 128 notifies the transaction manager 130 to assure that the billing system 132 is properly brought into play. The session manager 128 selects a video server from the video server(s) 126 having the requested content on it and having a signal path that reaches the node serving the subscriber terminal. The session manager 128 also enables the routing matrix 136 to properly route the selected video content through the correct edge resources 140 for delivery to the subscriber terminals 110 through 116 (described in association with FIG. 1 above).

It should be noted that for switched digital video, content selections may be delivered according to scheduling maintained via the EPG server or SDV catalog server 134. As such, the content delivery to the respective subscriber terminal may be delivered beginning at a point within the content other than at the beginning of the particular content selection according to a scheduled start time for the content and the schedule of availability for the selected content. Accordingly, the session manager 128 may make a determination as to whether any other subscriber terminal is currently tuned to the selected content (e.g., whether the respective video server is already distributing the selected content). If any other subscriber terminal is currently tuned to the selected content, the session manager 128 may adjust encryption and routing resources, as described in more detail below, to encrypt and route the selected content to the requesting subscriber terminal. Alternatively, if no other subscriber terminal is currently tuned to the selected content, for a first subscriber terminal to tune to the respective content selection, the session manager 128 may communicate with the video server from the video server(s) 126 having the requested content to begin distribution of the selected content at a particular location within the content as correlated with the EPG and the programming location within the EPG.

Changes may be implemented to the method employed by the headend 102 for creating dynamic program specific information (PSI) data as described in more detail below. The session manager 128 is made aware of which conditional access method is appropriate for a session requested by a specific subscriber terminal. This information may in turn be transferred to the video server(s) 126 that has been selected as the source for the session so that the appropriate PSI may be created for the session, including conditional access specific data. The video server(s) 126 is cognizant of the conditional access resources (ECMs) for each program stored on the server and these may be dynamically allocated on unique PIDs along with PIDs for the corresponding audio and video data. The PSI generated for each specific session, in addition to indicating the assigned PIDs for A/V content, may indicate the appropriate conditional access system identifier (CASID), which is unique to each conditional access system provider and the PID assigned for the ECMs associated with the session.

Likewise, the video server(s) 126 dynamically allocates PIDs for the respective audio and video component streams for each session. ECM PID or data resource information will be added later in a downstream session encryption device(s) 138 providing the alternative conditional access encryption for those sessions destined for decoding by a given subscriber terminal of the subscriber terminals 110 through 116.

A function of the video server(s) 126, in addition to origination of session A/V content, is the creation of the associated, session specific program specific information (PSI). This information is a departure from the broadcast model in that the PSI is extremely dynamic. The content of the program allocation table (PAT) and subordinate program map tables (PMTs) change whenever a new session is started or ended. In the broadcast world, the PSI seldom changes because the PSI tables reflect only the structure of the transport multiplex and not the actual A/V content carried within.

The video server(s) 126 dynamically assigns a new session to an existing, available "slot" in an outgoing transport multiplexed stream. The slot is denoted by the MPEG program number and in many cases, the combination of a transport stream (TSID) and program number determine at the service level a unique session and the routing that occurs as a result. Edge resources 140 generally are not configured dynamically. The routing of content appearing on a particular input port to a specific QAM carrier at the output is determined through a preconfigured, static assignment of TSID/input port and program number mapping to specific QAM resources in the device. This same mapping information is also loaded in the session manager 128 so that once a session is requested by and authorized for a specific subscriber terminal 110 through 116, a configuration (e.g., a routing solution) to a routing matrix 144 may be determined to find the appropriate video server(s) 126 and edge resources 140 serving the requestor. This solution also considers dynamic issues such as upon which video server(s) 126 the requested asset is loaded, and server loading/available slots in addition to the simpler, static solution of finding the first possible path to the requesting subscriber terminal of the subscriber terminals 110 through 116.

In addition to configuring the routing matrix 144 and provisioning the session with PIDs and PSI appropriate to follow the intended route, elements of the same information (program ID and QAM frequency) are also communicated to the session client at the respective subscriber terminal device at the subscriber's premises so that the requested stream may be properly received and presented to the subscriber.

The session manager 128 additionally enables a selective encryption processor 146 to select one or more of the session encryption device(s) 138 capable of performing encryption using a conditional access system associated with the subscriber terminal(s) that are tuned to a particular content selection. The output stream is then routed at routing matrix 136 to appropriate edge resources 140 for delivery to the respective subscriber terminal 110 through 116. The session encryption device(s) 138 performs encryption using the conditional access system associated with the respective subscriber terminals 110 through 116 and encrypts the "critical" packets on service PIDs using the conditional access system associated with each such tuned subscriber terminal, as provisioned by the session manager 128.

It should be noted, as described above, that where a single subscriber terminal that uses a single DRM or CA is tuned to a channel/content selection, the content selection may be fully encrypted using the single DRM or CA associated with that tuned subscriber terminal to further decrease bandwidth. When a second subscriber terminal requests the content selection, the session manager 128 may determine whether a new/second DRM or CA is used by the second subscriber terminal. If a new/second DRM or CA is used by the second subscriber terminal, the session manager 128 coordinates a transition from full encryption of the video stream for the selected content for the first DRM or CA to multiple partial encryption of the video stream for the selected content via the routing matrix 144 and the session encryption device(s) 138. The transition to multiple partial encryption conserves bandwidth for the switched digital video stream. This conserved bandwidth may be used for data services or other purposes. Other variations will also occur to those skilled in the art upon consideration of the present teaching.

While the present example depicts encryption for alternative CAs and DRMs on the fly, these portions may be pre-encrypted and selected in response to SDV content requests without departure from the scope of the present subject matter. Additionally, a preprocessor may be used to perform full or selective encryption of content to be loaded onto the video server(s) 126. A modified file protocol may be used to allow the video server(s) 126 to import and associate these files. Either the preprocessor or the video server(s) 126 may be designed to perform the indexing. An alternate instantiation may be use to perform all selective encryption pre-processing (e.g., PID mapping and packet duplication) within the video server(s) 126 itself. This may be accomplished by modifying the video server(s) 126 application to add a preprocessor task as a separate executable, called by the video server(s) 126 during the process to prepare content for pre-encryption.

Figure 3:
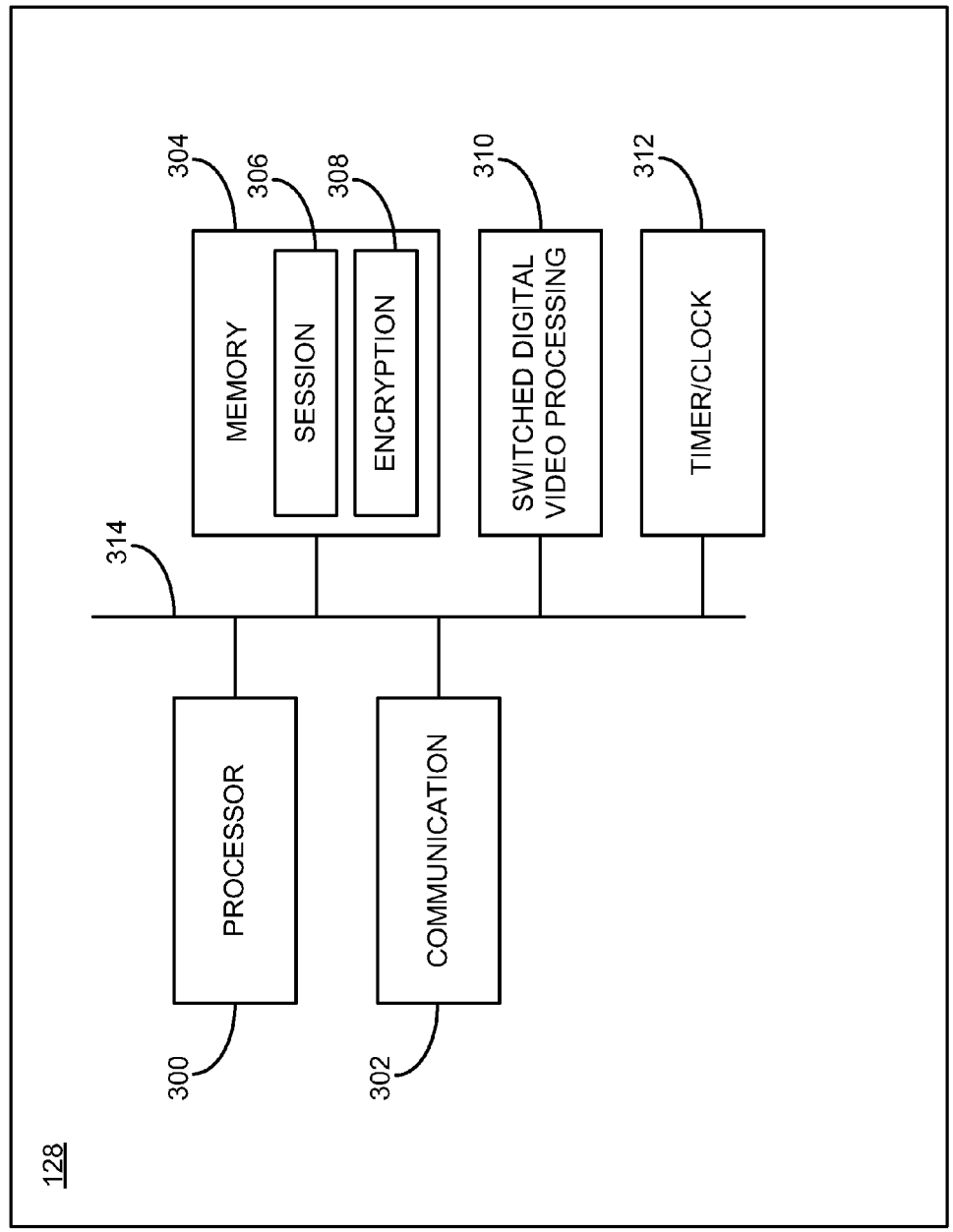
FIG. 3 is a block diagram of an example of an implementation of a session management device that is capable of providing on-demand switched content encryption consistent with certain embodiments of the present invention.

FIG. 3 is a block diagram of an example of an implementation of a session management device, such as the session manager 128, that is capable of providing on-demand switched content encryption. A processor 300 provides computer instruction execution, computation, and other capabilities within the session manager 128.

A communication module 302 provides communication capabilities for interaction with the subscriber terminals 110 through 116 via the cable distribution network 104, the one or more video server(s) 126, the transaction manager 130, the routing matrix 136, the routing matrix 144, and the selective encryption processor 146, as described above and in more detail below.

A memory 304 includes a session information storage area 306 that that stores information for active sessions, including, for each active session, a subscriber terminal identifier (ID), a currently selected channel, and other information associated with each active session. An encryption information storage area 308 stores information for a CA or DRM system associated with the subscriber terminals 110 through 116 associated with each active session, a selected CA or DRM used for selective encryption of content distributed to each subscriber terminal during the respective sessions, and other related information.

It is understood that the memory 304 may include any combination of volatile and non-volatile memory suitable for the intended purpose, distributed or localized as appropriate, and may include other memory segments not illustrated within the present example for ease of illustration purposes. For example, the memory 304 may include a code storage area, an operating system storage area, a code execution area, and a data area without departure from the scope of the present subject matter.

A session processing module 310 is also illustrated. The session processing module 310 provides session coordination activities for the session manager 128, as described above and in more detail below. The session processing module 310 implements control functionality for the automated on-demand switched content encryption of the SDV system 100.

A timer/clock module 312 is illustrated and used to determine timing and date information, such as for use in association with an EPG to determine a content location for switched digital video content distribution, as described above and in more detail below. As such, the session processing module 310 may utilize information derived from the timer/clock module 312 for information processing activities, such as for determination of content locations relative to EPG scheduling times for content selections and for initiating streaming of content selections from the determined content locations.

Though the communication module 302 and the session processing module 310 are illustrated as component-level modules for ease of illustration and description purposes, it should be noted that these modules may include any hardware, programmed processor(s), and memory used to carry out the functions of this module as described above and in more detail below. For example, these modules may include additional controller circuitry in the form of application specific integrated circuits (ASICs), processors, and/or discrete integrated circuits and components for performing communication and electrical control activities associated with the respective devices. Additionally, these modules may also include interrupt-level, stack-level, and application-level modules as appropriate. Furthermore, the modules may include any memory components used for storage, execution, and data processing for performing processing activities associated with the module.

It should also be noted that the session processing module 310 may form a portion of other circuitry described without departure from the scope of the present subject matter. Further, the session processing module 310 may alternatively be implemented as an application stored within the memory 304. In such an implementation, the session processing module 310 may include instructions executed by the processor 300 for performing the functionality described herein. The processor 300 may execute these instructions to provide the processing capabilities described above and in more detail below for the session manager 128. The session processing module 310 may form a portion of an interrupt service routine (ISR), a portion of an operating system, a portion of a browser application, or a portion of a separate application without departure from the scope of the present subject matter.

The processor 300, the communication module 302, the memory 304, the session processing module 310, and the timer/clock module 312 are interconnected via one or more interconnections shown as interconnection 314 for ease of illustration. The interconnection 314 may include a system bus, a network, or any other interconnection capable of providing the respective components with suitable interconnection for the respective purpose.

Figure 4:
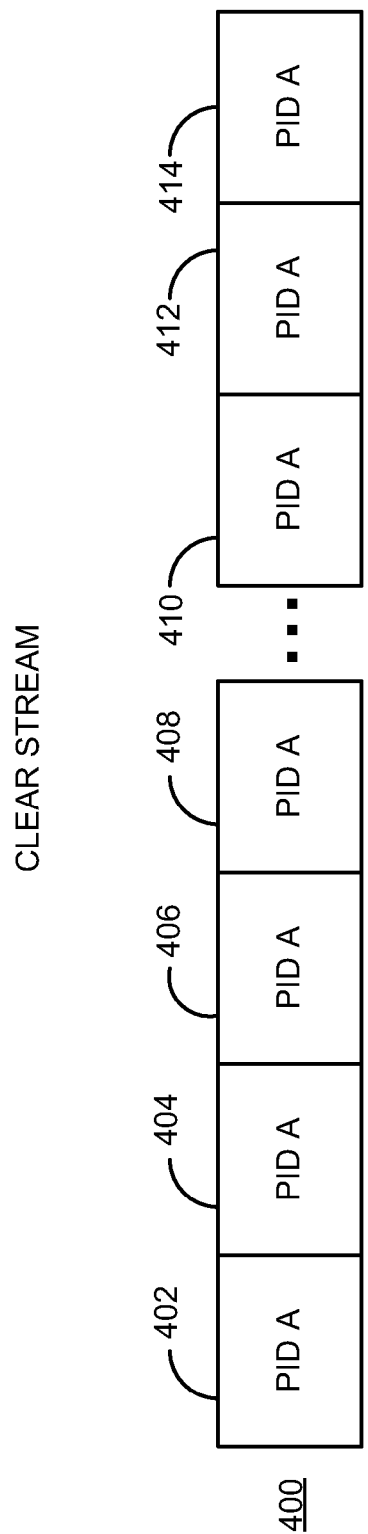
FIG. 4 is a diagram of an example of an implementation of a portion of a clear (unencrypted) video content stream distributed by a video server in response to an instruction from a session manager to stream the video content in response to a first request for on-demand switched digital video content from a subscriber terminal consistent with certain embodiments of the present invention.

FIG. 4 is a diagram of an example of an implementation of a portion of a clear (unencrypted) video content stream 400 distributed by a video server, such as one of the video server(s) 126, in response to an instruction from the session manager 128 to stream the video content in response to a first request for on-demand switched digital video content from a subscriber terminal, such as the subscriber terminal_1 110. It should be noted that the present example depicts stored clear content for ease of description purposes. However, as appropriate for a given implementation, content stored within the video server(s) 126 may be fully encrypted using a legacy encryption scheme or may be multiply partially encrypted for security reasons. Other variations on storage of content for security, storage, real-time processing, and distribution bandwidth are possible and all are considered within the scope of the present subject matter. As such, the present example is not to be considered limiting.

As can be seen from FIG. 4, all of packets 402 through 414 of the portion of a clear (unencrypted) video content stream 400 have a single PID (e.g., PID A) associated with them. Further, the packets 402 through 414 are not indicated to be encrypted (e.g., by a lack of indication of a DRM or CA in association with the respective packets).

Figure 5:
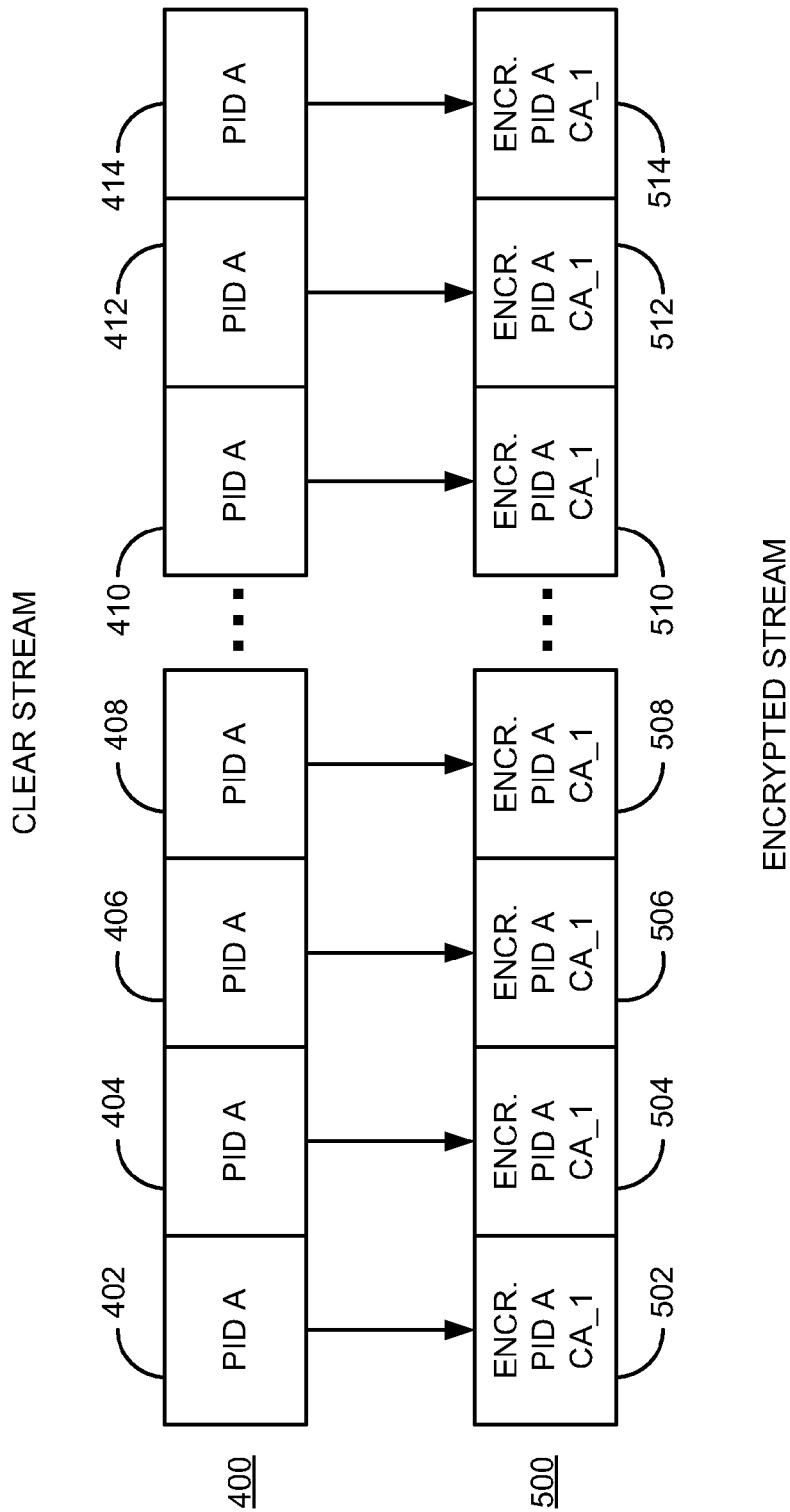
FIG. 5 is a diagram of an example of an implementation of a fully encrypted portion of a video content stream generated, for example as coordinated by a session manager, from the portion of a video content stream of FIG. 4 in response to a first request for on-demand switched digital video content from a subscriber terminal consistent with certain embodiments of the present invention.

FIG. 5 is a diagram of an example of an implementation of a fully encrypted portion of a video content stream 500 generated, for example as coordinated by the session manager 128, from the portion of a video content stream 400 of FIG. 4 in response to a first request for on-demand switched digital video content from a subscriber terminal, such as the subscriber terminal_1 110. As described above, in response to a first request for switched digital video content from the subscriber terminal_1 110, the session manager 128 may determine a DRM or CA associated with the requesting subscriber terminal 110 and the content may be fully encrypted on the fly (e.g., in real time) via one of the session encryption device(s) 138 using the DRM or CA associated with the subscriber terminal 110. Accordingly, as can be seen from FIG. 5, all packets 502 through 514 of the fully encrypted portion of a video content stream 500 are encrypted with the encryption association with the subscriber terminal_1 110 (CA_1 for purposes of the present example). Additionally, a mapping of the packets 402 through 414 to the packets 502 through 514 is represented within FIG. 5. As also described above, the fully encrypted portion of a video content stream 500 may begin from a location within the stored content that is represents a video play location indicated within an EPG as a current time relative to an indicated start time for the content. As such, switched digital video differs from video on demand in that streams within a switched digital video start in response to requests for a channel at a current play location relative to a scheduled start time for the content, regardless of whether the content was previously switched and distributed during the scheduled time slot. It should be noted that while the present example of FIG. 5 shows a fully encrypted portion of a content stream, single partial encryption may be used, as represented by one partially encrypted portion of the selectively (partially) multiple encrypted stream of the example of FIG. 6 described below for certain implementations.

Figure 6:
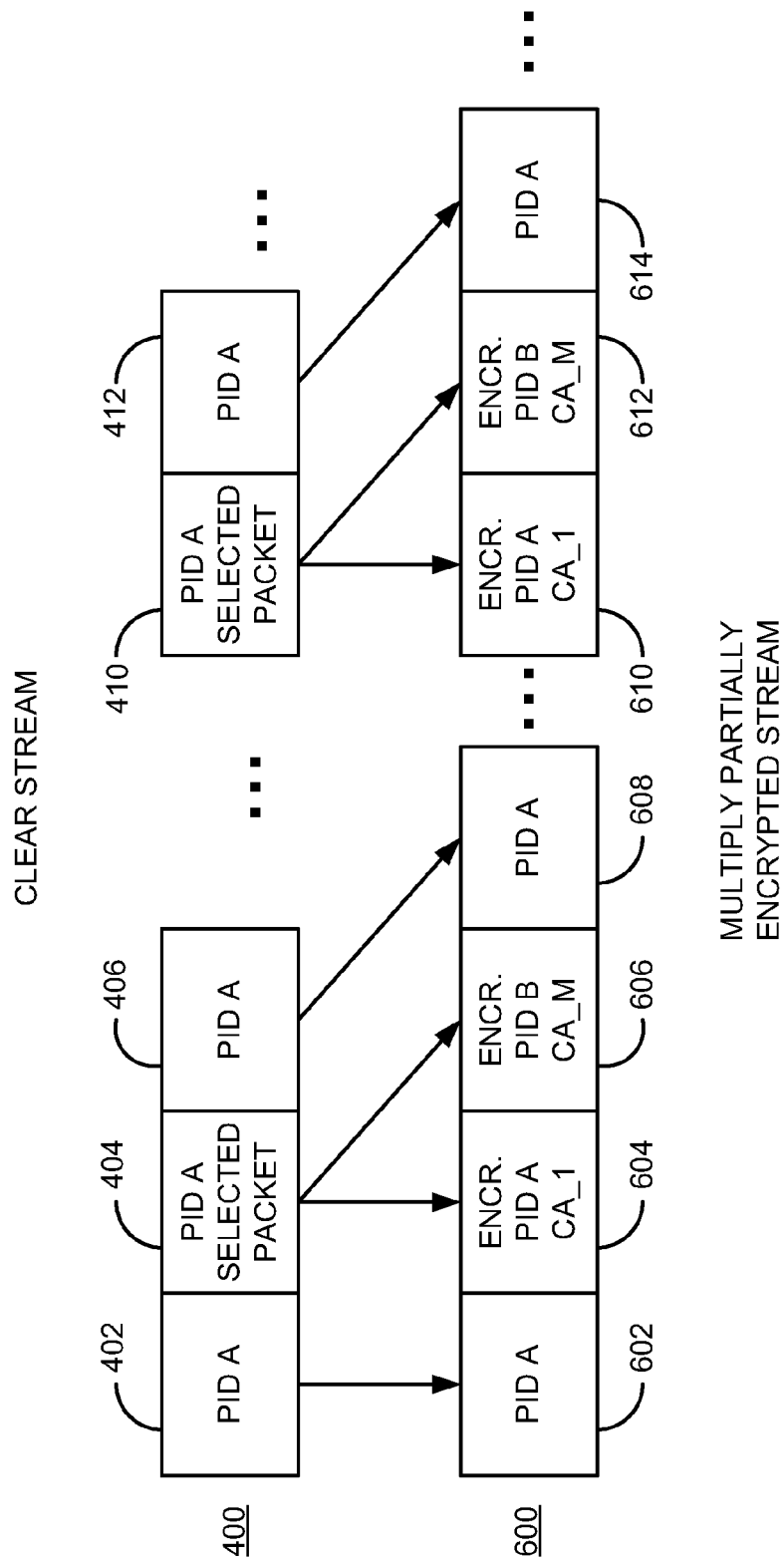
FIG. 6 is a diagram of an example of an implementation of a selectively (partially) multiple encrypted portion of a video content stream generated, for example as coordinated by a session manager, from the portion of a video content stream of FIG. 4 in response to a second request for on-demand switched digital video content from a second subscriber terminal that utilizes a second encryption system type consistent with certain embodiments of the present invention.

FIG. 6 is a diagram of an example of an implementation of the selectively (partially) multiple encrypted portion of a video content stream 600 generated, for example as coordinated by the session manager 128, from the portion of a video content stream 400 of FIG. 4 in response to a second request for on-demand switched digital video content from a second subscriber terminal that utilizes a second encryption system type, such as the subscriber terminal_M 112. As also described above, in response to a second request for switched digital video content from the subscriber terminal_M 112, the session manager 128 may determine a DRM or CA associated with the requesting subscriber terminal_M 112 and may determine whether the DRM or CA associated with the subscriber terminal_M 112 is different from the DRM or CA associated with the subscriber terminal_1 110.

If the subscriber terminal_M 112 utilizes the same DRM or CA as the subscriber terminal_1 110, then no change to the fully encrypted output stream as represented via the fully encrypted portion of a video content stream 500, shown in FIG. 5, would be needed because both devices may decrypt the content stream using the same DRM or CA. The system may choose to deliver the content using single selective encryption nonetheless, and may even choose to deliver the content using multiple selective encryption, as appropriate for a given implementation. Delivery of content using multiple selective encryption may not save bandwidth in this scenario, but may offer an improvement for provisioning streams. This aspect is not discussed further. Returning to the present example, alternatively, if the subscriber terminal_M 112 utilizes a different DRM or CA from the one used by the subscriber terminal_1 110, then the output stream may be transitioned from a fully encrypted content stream to a multiply partially encrypted content stream as represented by the multiply partially encrypted portion of a video content stream 600 on the fly (e.g., in real time). The multiply partially encrypted portion of a video content stream 600 may be generated via two of the session encryption device(s) 138 using the DRM or CA associated with the subscriber terminal_1 110 and the subscriber terminal_M 112, respectively.

Accordingly, as can be seen from FIG. 6, certain packets are selected from the unencrypted clear video content stream 400 for multiple partial encryption. As described above, certain types of packets may be encrypted to render a portion of a video image difficult or impossible to view if not properly decrypted, or which may render a portion of audio difficult or impossible to hear if not properly decrypted. These packets are termed "critical" packets herein for convenience. However, this term should not be considered limiting.

As such, with reference to FIG. 6, the unencrypted packets 402, 406 and 412 of the portion of a clear video content stream 400 are shown within the multiple partially (selectively) encrypted portion of a video content stream 600 as packets 602, 608, and 614, respectively. In this example, packet 402 is sent ahead of packet 404, and packet 404 is sent ahead of packet 406, and so on. However, this should not be considered limiting as other sequences may be used as appropriate for a given implementation. The unencrypted packets 404 and 410 of the portion of a clear video content stream 400 are shown to have been selected for multiple partial encryption. The selected unencrypted packets 404 and 410 are shown to have been processed via a CA_1 system and a CA_M system, respectively, associated with the respective subscriber terminal_1 110 and the subscriber terminal_M 112.

Additionally, the selected unencrypted packet 404 is shown mapped into encrypted packet 604 encrypted under CA_1 for subscriber terminal_1 110. Within the present example, the encrypted packet 604 is given the same PID as the non-encrypted packets (e.g., PID A) within the multiple partially encrypted portion of the video content stream 600. The selected unencrypted packet 404 is also shown mapped into encrypted packet 606 encrypted under CA_M for subscriber terminal_M 112. Similarly, within the present example, the encrypted packet 606 is given a new PID (e.g., PID B) within the multiple partially encrypted portion of the video content stream 600. It should be understood that different PID assignments are possible and all are considered within the scope of the present subject matter.

As described above for the selected unencrypted packet 404, the selected unencrypted packet 410 is shown mapped into encrypted packet 610 encrypted under CA_1 for subscriber terminal_1 110 and mapped into encrypted packet 612 encrypted under CA_M for subscriber terminal_M 112. Within the present example, the encrypted packet 610 is given the same PID as the non-encrypted packets (e.g., PID A) within the multiple partially encrypted portion of the video content stream 600, and the encrypted packet 612 is given the same new PID (e.g., PID B) used by the subscriber terminal_M 112.

As such, within the present example, the subscriber terminal_1 110 does not need to know about selective multiple encryption because all of its packets destined for decryption via subscriber terminal_1 110 will be sent using PID A. Whether a packet is encrypted or not is typically signaled through header bits and is transparent to the respective subscriber terminal. Subscriber terminal_M 112 is aware of multiple partial encryption. It replaces the packet encrypted for terminal_1 110 using PID A with the packet encrypted for subscriber terminal_M 112 using PID B. It should be noted that while the example of FIG. 6 shows multiple partial encryption for two different encryption systems, this example may be extended for additional different encryption systems (e.g., three, four, five, etc.) without departure from the scope of the present subject matter.

As shown within FIG. 4 through FIG. 6, stored content may be streamed (e.g., switched) in response to a first request for the content from a subscriber terminal beginning from a location within the content represented within an EPG. The content may be fully or singular partially encrypted for the first subscriber terminal to request the content using a DRM or CA associated with the first subscriber terminal. In response to a second or additional subscriber terminal request to tune to the content, the content may be multiply partially encrypted for each of the respective DRMs and CAs associated with the set of subscriber terminals that are requesting to tune to the content. As such, multiple partial encryption may be used within a switched digital system to transition from fully encrypted content to multiply partially encrypted content, and partial encrypted content may be provided for each different DRM or CA associated with subscriber devices that requests the content. Accordingly, bandwidth may be conserved during transmission of switched digital video.

It should further be understood that in response to a determination that subscribers are requesting to tune to other content, the content stream may be transitioned incrementally to remove partial encryption for any DRM or CA associated with subscriber terminals that are no longer requesting to tune to the content. Further, when only one or more subscriber terminals associated with a single DRM or CA remain tuned to switched digital video content, that content may be transitioned to fully encrypted content and again use a single PID. When no subscriber terminals are tuned to a given content stream, that stream may be terminated and the allocated bandwidth recaptured.

Figure 7:
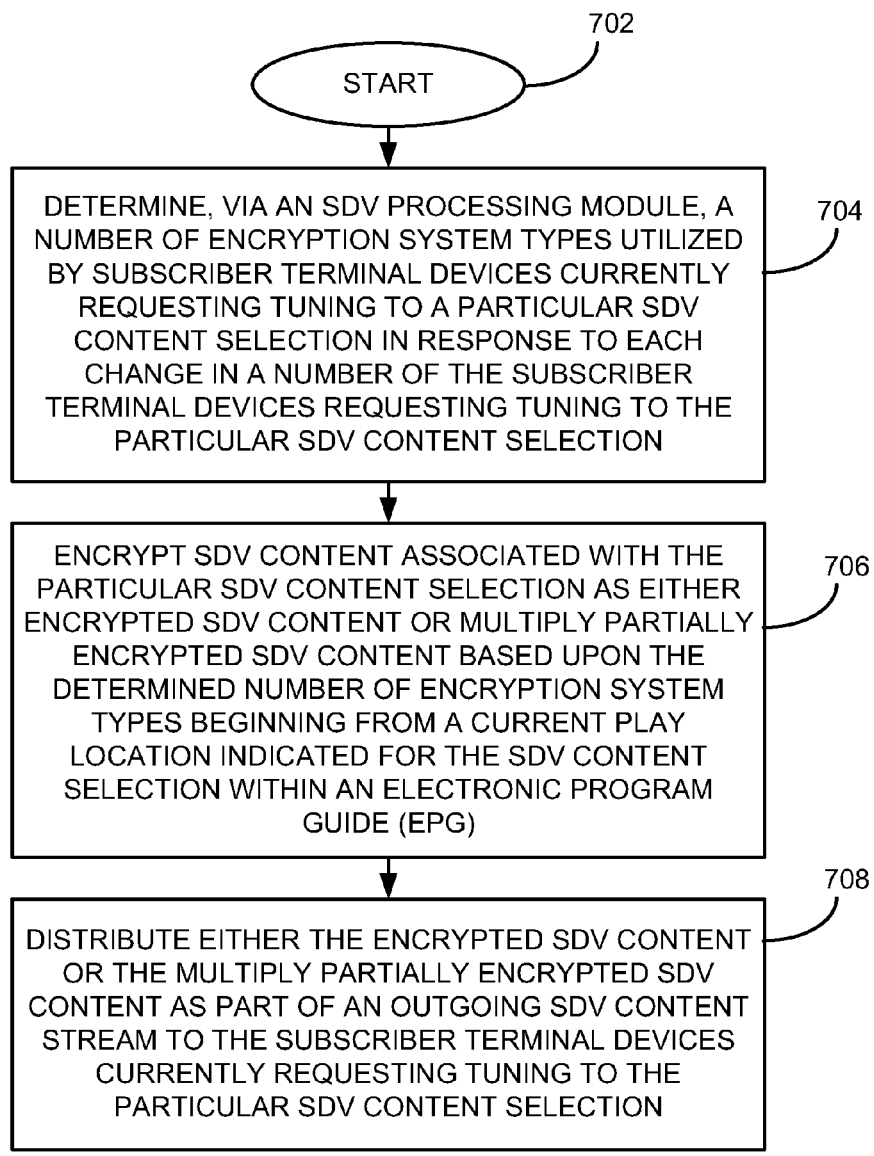
FIG. 7 is a flow chart of an example of an implementation of a process that provides automated on-demand switched content encryption consistent with certain embodiments of the present invention.
Figure 8A:
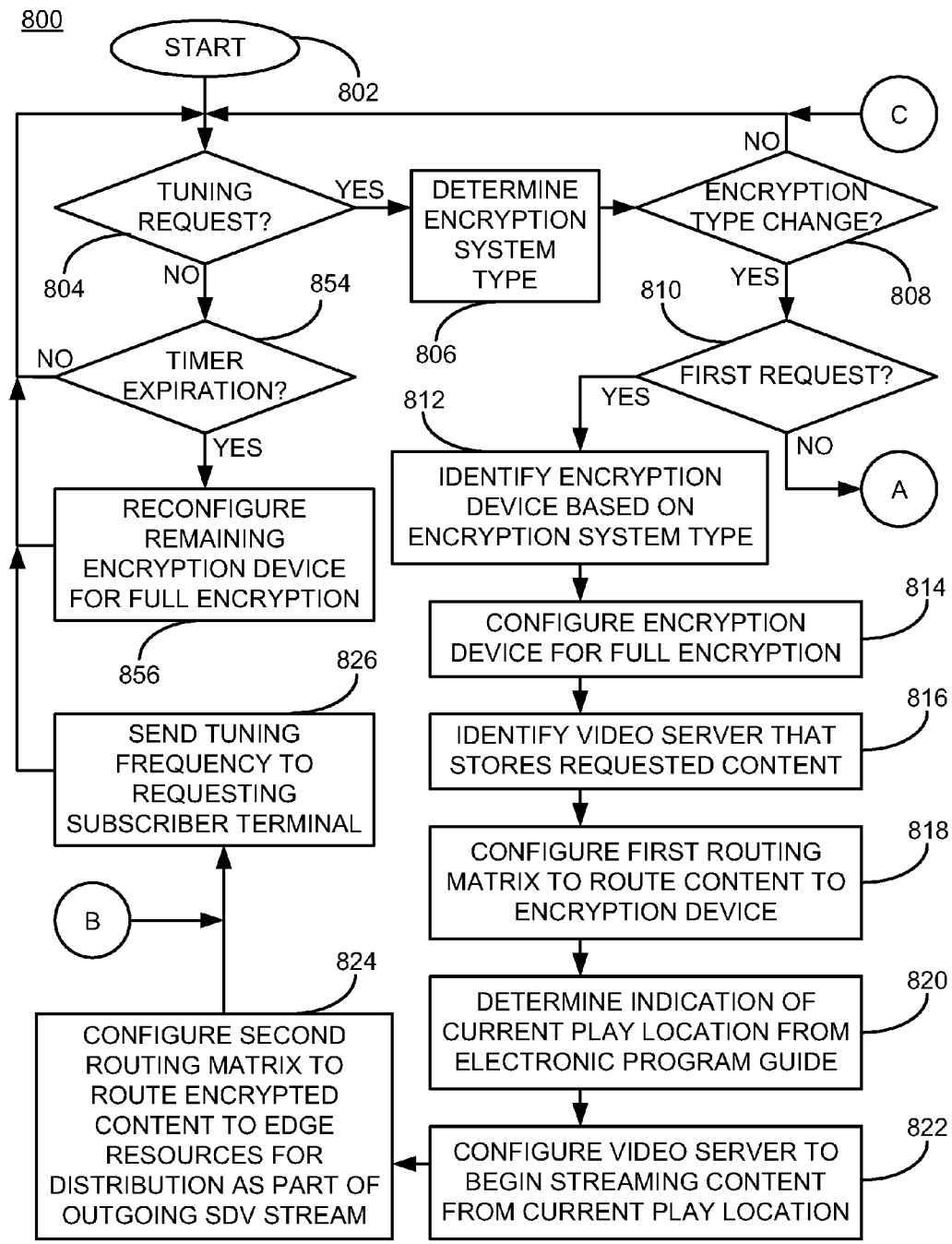
FIG. 8A is a flow chart of an example of an implementation of initial processing of a process for automated on-demand switched content encryption consistent with certain embodiments of the present invention.
Figure 8B:
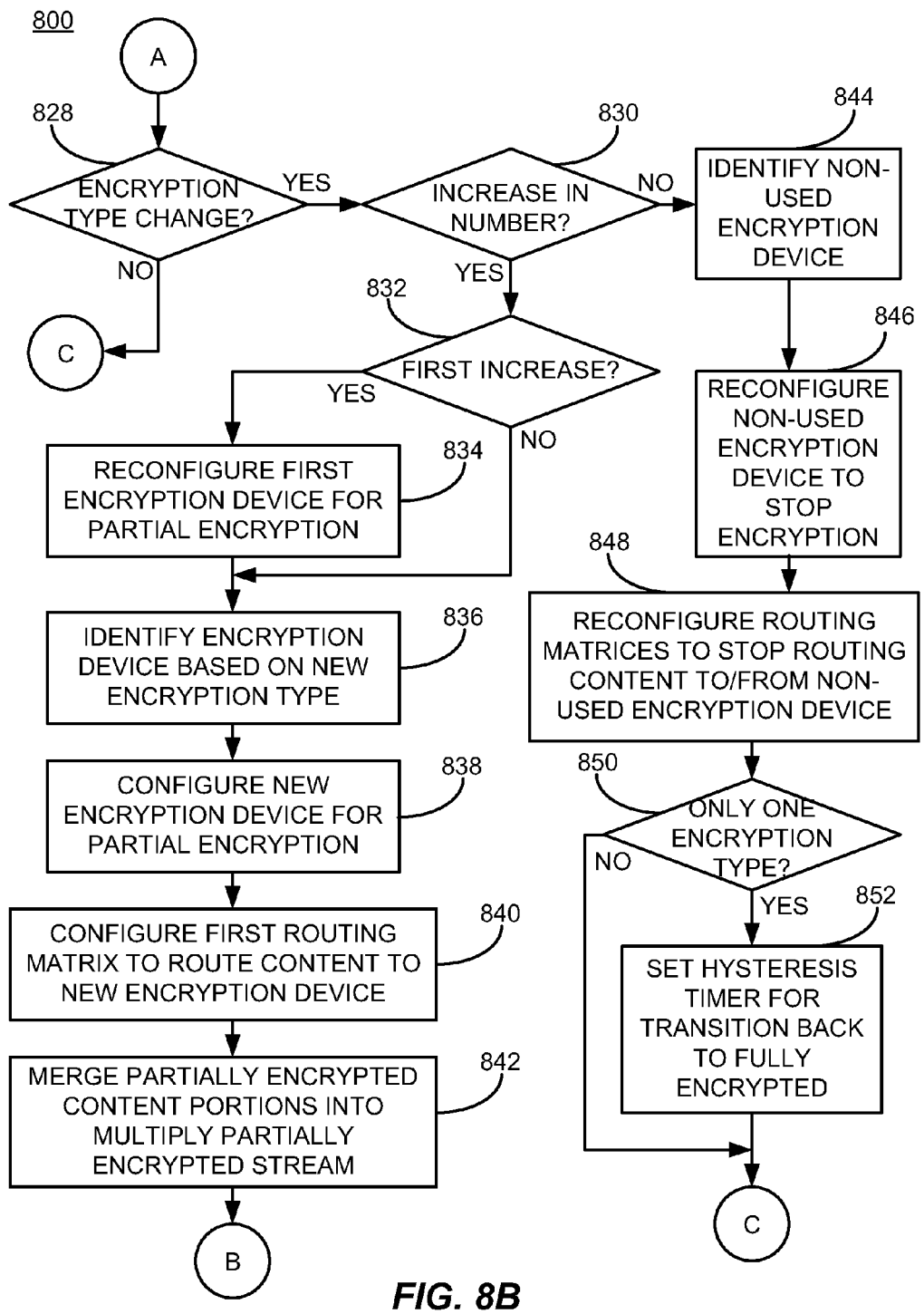
FIG. 8B is a flow chart of an example of an implementation of additional processing of a process for automated on-demand switched content encryption consistent with certain embodiments of the present invention.

FIG. 7 through FIG. 8B below describe example processes that may be executed by such devices, such as the session manager 128, to perform the automated on-demand switched content encryption associated with the present subject matter. Many other variations on the example processes are possible and all are considered within the scope of the present subject matter. The example processes may be performed by modules, such as the session processing module 310 and/or executed by the processor 300, associated with such devices. It should be noted that time out procedures and other error control procedures are not illustrated within the example processes described below for ease of illustration purposes. However, it is understood that all such procedures are considered to be within the scope of the present subject matter.

FIG. 7 is a flow chart of an example of an implementation of a process 700 that provides automated on-demand switched content encryption. The process 700 starts at 702. At block 704, the process 700 determines, via an SDV processing module, a number of encryption system types utilized by subscriber terminal devices currently requesting tuning to a particular SDV content selection in response to each change in a number of the subscriber terminal devices requesting tuning to the particular SDV content selection. At block 706, the process 700 encrypts SDV content associated with the particular SDV content selection as either encrypted SDV content or multiply partially encrypted SDV content based upon the determined number of encryption system types beginning from a current play location indicated for the SDV content selection within an electronic program guide (EPG). At block 708, the process 700 distributes either the encrypted SDV content or the multiply partially encrypted SDV content as part of an outgoing SDV content stream to the subscriber terminal devices currently requesting tuning to the particular SDV content selection.

FIGS. 8A-8B are a flow chart of an example of an implementation of a process 800 for automated on-demand switched content encryption. The present example is directed to processing associated with a single switched digital content selection that may be requested within a system, such as the switched digital video (SDV) system 100. However, it is understood that a process similar to the process 800 may be performed for each switched digital content selection processed within a system, such as the SDV system 100. FIG. 8A illustrates initial processing within the process 800. The process 800 starts at 802. At decision point 804, the process 800 makes a determination as to whether a tuning request associated with a SDV content selection has been received. For purposes of the present example, the determination at decision point 804 may be considered a determination of a change in a number of subscriber terminal devices requesting tuning to the particular SDV content selection. Processing for a negative determination at decision point 804 will be deferred and described in more detail below in association with transition timing from partially or multiply partially encrypted SDV content back to fully encrypted SDV content. Additionally, a tuning request, for purposes of the present example, may also include a request to tune away from a content selection to which a subscriber terminal was previously tuned.

In response to determining at decision point 804 that a tuning request has been received, the process 800 determines an encryption system type associated with the subscriber terminal that has issued the tuning request at block 806. At decision point 808, the process 800 makes a determination as to whether the determined encryption system type associated with the subscriber terminal that has issued the tuning request results in an encryption type change associated with a set of encryption types associated with currently-tuned subscriber terminals. It is understood that the determination at decision point 808 will be true for a first iteration of the process 800 and the set of encryption types will then include a set of one encryption type. However, for clarity and for subsequent iterations of the process 800, in response to a determination at decision point 808 that an encryption type change has not occurred as a result of the tuning request of the subscriber terminal, the process 800 returns to decision point 804 and iterates as described above and in more detail below.

In response to a determination at decision point 808 that an encryption type change has occurred, the process 800 makes a determination at decision point 810 as to whether the current tuning request represents a first request or a first change in a number of subscriber terminal devices requesting tuning to the particular SDV content selection. As such, for the first subscriber terminal device requesting tuning to the particular SDV content selection, the encryption type change may represent a change from zero (0) subscriber terminal devices to one (1) subscriber terminal device and the determined number of encryption system types may include one encryption system type. For purposes of the present example, it is understood that configuration of initial processing for initially delivering the switched digital content may be performed in response to such a first request to tune to a particular SDV content selection and that the particular SDV content selection would not otherwise necessarily be distributed from the cable headend, such as the cable headend 102, prior to such a first request. In this manner the headend 102 may conserve bandwidth for SDV processing and content distribution, and may make the conserved bandwidth available for data traffic or other uses.

In response to determining at decision point 810 that the tuning request from the subscriber terminal represents a first request for the particular SDV content selection, the process 800 identifies an encryption device based upon the determined encryption system type at block 812. It is understood that the encryption device may include an encryption device, such as one the session encryption device(s) 138 described above. At block 814, the process 800 configures the identified encryption device for full encryption. It should be understood that the present example encrypts the particular SDV content selection as fully encrypted content based upon the determined encryption system type associated with the first subscriber terminal requesting tuning to the particular SDV content selection. However, single partial encryption may also be utilized without departure from the scope of the present subject matter.

At block 816, the process 800 identifies a video server that stores the requested SDV content associated with the SDV content selection. It should be understood that identifying the video server that stores the requested SDV content may include identifying one of a plurality of video servers, such as the video server(s) 126, described above. At block 818, the process 800 configures a first routing matrix to route content from the identified video server to the identified encryption device that includes a first encryption system type associated with the first subscriber terminal device. For purposes of the present example, the first routing matrix may include a routing matrix, such as the routing matrix 144, described above.

At block 820, the process 800 determines an indication of a current play location from an electronic program guide (EPG) for the requested SDV content. The indication of the current play location may be determined, for example, from the EPG server or SDV catalog server 134 or other similar device.

At block 822, the process 800 configures the identified video server that stores the requested SDV content to begin streaming the SDV content from the current play location. It is understood that configuration of the video server to begin streaming the SDV content from the current play location may result in routing of the SDV content beginning from the current play location to the identified encryption device and that content will begin being encrypted, within the present example, as fully encrypted SDV content. At block 824, the process 800 configures a second routing matrix, such as the routing matrix 136 described above, to route encrypted content to edge resources, such as the edge resources 140, for distribution as part of an outgoing SDV content stream.

Accordingly, the process 800 begins distributing, within the present example, fully encrypted SDV content as part of an outgoing SDV content stream to the subscriber terminal device that has initially requested tuning to the particular SDV content selection. It is further understood that the SDV content selection that forms a portion of the outgoing SDV content stream may be modified in response to subsequent additional tuning requests from additional subscriber terminals or may be removed from the outgoing SDV content stream if all subscriber terminals that have requested tuning to the requested SDV content tune away from that content. Accordingly, the process 800 may reclaim bandwidth in response to determining that no subscriber terminals are tuned to the particular SDV content selection.

At block 826, the process 800 sends a tuning frequency at which the selected edge resource transmits the encrypted SDV content so that the requesting subscriber terminal may tune to that frequency. The process 800 returns to decision point 804 and iterates as described above.

Returning to the description of decision point 810, in response to determining that the tuning request is not a first tuning request (e.g., for subsequent requests) for the same SDV content selection, the process 800 transitions to the processing shown and described in association with FIG. 8B.

FIG. 8B illustrates additional processing associated with the process 800 for automated on-demand switched content encryption. At decision point 828, the process 800 makes a determination as to whether an encryption type change has resulted from the additional tuning request. For purposes of the present example, it should be understood that multiple subscriber terminals may utilize the same encryption system type or may utilize different encryption system types. As such, the processing at decision point 828 may also include determining a number of encryption system types utilized by subscriber terminal devices that are currently requesting tuning to the particular SDV content selection in response to each change in the number of subscriber terminal devices requesting tuning to the particular SDV content selection.

In response to determining that an encryption type change has not resulted from the additional tuning request at decision point 828, the process 800 returns to the processing shown within FIG. 8A and decision point 804 and continues encrypting the SDV content as it is currently being encrypted. For purposes of the present example, it is understood that this may constitute continuing encrypting the SDV content as fully encrypted SDV content where a second or subsequent tuning request does not result in an encryption system type change. Alternatively, in response to additional processing described in more detail below, where multiple partial encryption has been initiated, a negative determination at decision point 828 may result in continuing to multiply partially encrypt the SDV content based upon previously-configured encryption system types.

Returning to the description of decision point 828, in response to determining that an encryption system type change has occurred, the process 800 makes a determination at decision point 830 as to whether an increase in the number of encryption system types has occurred or whether a decrease in the number of encryption system types has occurred. In response to determining at decision point 830 that the encryption system type change has resulted in an increase in the number of encryption system types requesting the SDV content, the process 800 makes a determination at decision point 832 as to whether this increase represents a first increase in the encryption system types.

As described in more detail below, a first increase in the number of encryption system types may result in transitioning encryption of the SDV content from full encryption under a single encryption system type to multiple partial encryption under multiple encryption system types. As such, in response to determining at decision point 832 that the increase in the number of encryption system types represents a first increase (e.g., two (2) encryption system types) the process 800 reconfigures the first encryption device for partial encryption at block 834. For purposes of the present example, reconfiguring the first encryption device for partial encryption may include identifying portions of the SDV content for partial encryption and instructing the respective encryption device to encrypt the identified portions of the SDV content rather than fully encrypting the SDV content. The identified portions of SDV content may include, for example, at least one of parallel program specific information (PSI) packets, duplicate program allocation table (PAT) packets, duplicate program map table (PMT) packets, duplicate network information table (NIT) packets; conditional access table (CAT) packets, entitlement management message (EMM) packets, entitlement control message (ECM) packets, or other information as appropriate for a given implementation.

In response to completion of reconfiguring the first encryption device for partial encryption at block 834, or in response to determining at decision point 832 that the increase in the number of encryption system types is not a first increase, the process 800 identifies an encryption device based upon the new encryption type at block 836. It is understood that, for each iteration of the process 800, the process 800 may identify, for each increase in the number of encryption system types, an A/V content encryption device that encrypts SDV content using the encryption system type associated with the increase in the number of encryption system types.

At block 838, the process 800 configures, for an increase in the number of encryption system types, the new encryption device for partial encryption of the same identified portions of the SDV content described above. At block 840, the process 800 configures the first routing matrix to additionally route requested SDV content from the video server that stores the requested content to the new encryption device. It is understood that the video server is currently streaming the SDV content to at least one other encryption device at this stage of processing. As such, additional encryption or changes in encryption begin from a current play location relative to the EPG. At block 842, the process 800 merges the partially encrypted content portions into a multiply partially encrypted content stream, such as described in association with FIG. 4 through FIG. 6 above. For purposes of the present example, it is understood that merging the partially encrypted content portions into the multiply partially encrypted stream may include additional configurations to a routing matrix, such as the routing matrix 136 described above. The process 800 then transitions back to the processing described in association with FIG. 8A at block 826 to send the tuning frequency to the requesting subscriber terminal that initiated the tuning request and iterates as described above.

Returning to the description of decision point 830, in response to determining that the encryption system type change was not an increase in the number of encryption system types (e.g., was a decrease in the number of encryption system types), the process 800 identifies the non-used encryption device at block 844. At block 846, the process 800 reconfigures the non-used encryption device to stop encryption. At block 848, the process 800 reconfigures any configured routing matrices to stop routing content to and from the non-used encryption device. As such, the process 800 removes partial encrypted content streams from the outgoing SDV content stream in response to discontinued use of encryption devices associated with the SDV content to reclaim bandwidth, such as for data or other services.

At decision point 850, the process 800 makes a determination as to whether only one encryption system type remains in use in association with the selected SDV content. In response to determining that only one encryption system type remains, the process 800 sets an encryption hysteresis timer, such as the timer/clock 312, for transitioning from a partially encrypted content stream to a fully encrypted content stream at block 852. Hysteresis is applied within the present example to allow reduced reconfiguration of encryption devices in the event that a subscriber terminal issues a new tuning request in relative proximity to a time that only one encryption system type is determined to be utilized to avoid transitioning unnecessarily between partial encryption and full encryption. An encryption hysteresis interval may be established as appropriate for a given implementation. As such, the hysteresis timer may be set for the given encryption hysteresis interval, for example, to a sub-second time interval, one or more seconds, one or more minutes, etc., as appropriate for a given implementation.

It should also be noted that, based upon the encryption hysteresis interval, the process 800 may encrypt the SDV content via one encryption system as single partially encrypted SDV content, again beginning from the current play location indicated for the SDV content selection within the EPG, in response to determining that the encryption hysteresis interval has not expired. Accordingly, the process 800 may transition the distributed multiply partially encrypted SDV content stream encrypted via two encryption system types to a single partially encrypted SDV content encrypted via one encryption system type until the hysteresis interval expires. However, it is understood that transitioning back to full encryption may be appropriate in certain implementations without use of hysteresis and as appropriate for the given implementation.

In response to either setting the hysteresis timer for transitioning back to fully encrypted content at block 852, or in response to determining at decision point 850 that more than one encryption type is still in use, the process 800 returns to the processing described in association with FIG. 8A at decision point 804.

Returning to the processing shown and described in association with FIG. 8A, and to the description of decision point 804, in response to determining that a tuning request has not been received, the process 800 begins iterating to determine whether a hysteresis timer expiration has occurred for transitioning back to fully encrypted content. The process 800 iterates between determining whether any requests have been received at decision point 804 and determining whether a hysteresis timer expiration has occurred at decision point 854 until either determination is affirmatively made. As such, the process 800 monitors a duration of time from a change in the number of subscriber terminal devices requesting tuning to a particular SDV content selection to a number of subscriber terminal devices utilizing one encryption system type. The process 800 also determines whether a hysteresis timer interval that regulates transitioning between single partial encryption and full encryption has expired based upon the monitored duration of time.

In response to determining at decision point 854 that the hysteresis timer interval has expired, the process 800 reconfigures the remaining encryption device for full encryption at block 856. As such, the process 800 may again encrypt the SDV content via one encryption system type as fully encrypted SDV content from the current play location in response to determining that the hysteresis interval has expired. The process 800 may further transition the distributed single partially encrypted SDV content stream that is encrypted via one encryption system type to fully encrypted SDV content via the single encryption system type. In response to reconfiguring the remaining encryption device for full encryption at block 856, the process 800 returns to decision point 804 and iterates as described above.

As such, the example process 800 processes tuning requests to tune to and from SDV content selections. The example process 800 further initially fully encrypts the SDV content and transitions to multiply partially encrypted content in response to a second and subsequent encryption system type associated with subscriber terminals that are requesting tuning to the SDV content selection. The process 800 additionally removes partially encrypted portions of the multiply partially encrypted SDV content stream in response to subscriber terminals types that are no longer in use. The process 800 applies a hysteresis interval to delay transitioning from a single partially encrypted stream back to a fully encrypted SDV content stream for a configurable time period.

Thus, in accord with certain implementations, a method of conserving bandwidth within a switched digital video (SDV) system involves determining, via a SDV processing module, a number of encryption system types utilized by subscriber terminal devices currently requesting tuning to a particular SDV content selection in response to each change in a number of the subscriber terminal devices requesting tuning to the particular SDV content selection, where: a first change in the number of the subscriber terminal devices requesting tuning to the particular SDV content selection includes a change from zero subscriber terminal devices to one subscriber terminal device and the determined number of encryption system types includes one encryption system type; and a second change in the number of the subscriber terminal devices requesting tuning to the particular SDV content selection includes a change from the one subscriber terminal device to two subscriber terminal devices that each utilize a different encryption system type and the determined number of encryption system types includes two encryption system types; encrypting SDV content associated with the particular SDV content selection as one of fully encrypted SDV content and singular partially encrypted SDV content in response to the first change in the number of the subscriber terminal devices requesting tuning to the particular SDV content selection and as multiply partially encrypted SDV content in response to the second change in the number of the subscriber terminal devices requesting tuning to the particular SDV content selection based upon the determined number of encryption system types beginning from a current play location indicated for the SDV content selection within an electronic program guide (EPG); and distributing the one of the fully encrypted SDV content and the singular partially encrypted SDV content in response to the first change in the number of the subscriber terminal devices requesting tuning to the particular SDV content selection and the multiply partially encrypted SDV content in response to the second change in the number of the subscriber terminal devices requesting tuning to the particular SDV content selection as part of an outgoing SDV content stream to the subscriber terminal devices currently requesting tuning to the particular SDV content selection.

In another implementation, a method of conserving bandwidth within a switched digital video (SDV) system involves determining, via an SDV processing module, a number of encryption system types utilized by subscriber terminal devices currently requesting tuning to a particular SDV content selection in response to each change in a number of the subscriber terminal devices requesting tuning to the particular SDV content selection; encrypting SDV content associated with the particular SDV content selection as either encrypted SDV content or multiply partially encrypted SDV content based upon the determined number of encryption system types beginning from a current play location indicated for the SDV content selection within an electronic program guide (EPG); and distributing either the encrypted SDV content or the multiply partially encrypted SDV content as part of an outgoing SDV content stream to the subscriber terminal devices currently requesting tuning to the particular SDV content selection.

In certain implementations, the method of conserving bandwidth within a switched digital video (SDV) system involving encrypting the SDV content associated with the particular SDV content selection as the encrypted SDV content involves encrypting the SDV content as fully encrypted SDV content. In certain implementations, the method of encrypting the SDV content associated with the particular SDV content selection as the encrypted SDV content involves encrypting the SDV content as singular partially encrypted SDV content. In certain implementations, a first change in the number of subscriber terminal devices requesting tuning to the particular SDV content selection includes a change from zero subscriber terminal devices to one subscriber terminal device and the determined number of encryption system types includes one encryption system type; and the method of encrypting the SDV content associated with the particular SDV content selection as either the encrypted SDV content or the multiply partially encrypted SDV content based upon the determined number of encryption system types beginning from the current play location indicated for the SDV content selection within the EPG involves encrypting the SDV content via the one encryption system type as one of fully encrypted SDV content and singular partially encrypted SDV content beginning from the current play location indicated for the SDV content selection within the EPG. In certain implementations, a second change in the number of subscriber terminal devices requesting tuning to the particular SDV content selection includes a change from the one subscriber terminal device to two subscriber terminal devices that each utilize a same encryption system type and the determined number of encryption system types includes one encryption system type; and the method of encrypting the SDV content associated with the particular SDV content selection as either the encrypted SDV content or the multiply partially encrypted SDV content based upon the determined number of encryption system types beginning from the current play location indicated for the SDV content selection within the EPG involves continuing encrypting the SDV content via the one encryption system type as the one of the fully encrypted SDV content and the singular partially encrypted SDV content beginning from the current play location indicated for the SDV content selection within the EPG. In certain implementations, a second change in the number of subscriber terminal devices requesting tuning to the particular SDV content selection includes a change from the one subscriber terminal device to two subscriber terminal devices that each utilize a different encryption system type and the determined number of encryption system types includes two encryption system types; and the method of encrypting the SDV content associated with the particular SDV content selection as either the encrypted SDV content or the multiply partially encrypted SDV content based upon the determined number of encryption system types beginning from the current play location indicated for the SDV content selection within the EPG involves encrypting the SDV content via each of the two encryption system types as the multiply partially encrypted SDV content beginning from the current play location indicated for the SDV content selection within the EPG; and the method of distributing either the encrypted SDV content or the multiply partially encrypted SDV content as part of the outgoing SDV content stream to the subscriber terminal devices currently requesting tuning to the particular SDV content selection involves transitioning the distributed encrypted SDV content to the multiply partially encrypted SDV content encrypted via the each of the two encryption system types. In certain implementations, a third change in the number of subscriber terminal devices requesting tuning to the particular SDV content selection includes a change from the two subscriber terminal devices to three subscriber terminal devices that each utilize a different encryption system type and the determined number of encryption system types includes three encryption system types; and the method of encrypting the SDV content associated with the particular SDV content selection as either the encrypted SDV content or the multiply partially encrypted SDV content based upon the determined number of different encryption system types beginning from the current play location indicated for the SDV content selection within the EPG involves encrypting the SDV content via each of the three encryption system types as the multiply partially encrypted SDV content beginning from the current play location indicated for the SDV content selection within the EPG; and the method of distributing either the encrypted SDV content or the multiply partially encrypted SDV content as part of the outgoing SDV content stream to the subscriber terminal devices currently requesting tuning to the particular SDV content selection involves transitioning the distributed multiply partially encrypted SDV content encrypted via the each of the two encryption system types to the multiply partially encrypted SDV content encrypted via the each of the three encryption system types. In certain implementations, one change in the number of subscriber terminal devices requesting tuning to the particular SDV content selection includes a change from a number of subscriber terminal devices utilizing two encryption system types to a number of subscriber terminal devices utilizing one encryption system type and the determined number of encryption system types includes one encryption system type; and the method further involves monitoring a duration of time from the one change in the number of subscriber terminal devices requesting tuning to the particular SDV content selection to the number of subscriber terminal devices utilizing one encryption system type; and determining whether an encryption hysteresis interval that regulates transitioning between partial encryption and full encryption has expired based upon the monitored duration of time. In certain implementations, the method of encrypting the SDV content associated with the particular SDV content selection as either the encrypted SDV content or the multiply partially encrypted SDV content based upon the determined number of different encryption system types beginning from the current play location indicated for the SDV content selection within the EPG involves encrypting the SDV content via the one encryption system type as singular partially encrypted SDV content beginning from the current play location indicated for the SDV content selection within the EPG in response to determining that the encryption hysteresis interval has not expired; and the method of distributing either the encrypted SDV content or the multiply partially encrypted SDV content as part of the outgoing SDV content stream to the subscriber terminal devices currently requesting tuning to the particular SDV content selection involves transitioning the distributed multiply partially encrypted SDV content encrypted via each of the two encryption system types to singular partially encrypted SDV content encrypted via the one encryption system type. In certain implementations, the method of encrypting the SDV content associated with the particular SDV content selection as either the encrypted SDV content or the multiply partially encrypted SDV content based upon the determined number of different encryption system types beginning from the current play location indicated for the SDV content selection within the EPG involves encrypting the SDV content via the one encryption system type as fully encrypted SDV content beginning from the current play location indicated for the SDV content selection within the EPG in response to determining that the encryption hysteresis interval has expired; and the method of distributing either the encrypted SDV content or the multiply partially encrypted SDV content as part of the outgoing SDV content stream to the subscriber terminal devices currently requesting tuning to the particular SDV content selection involves transitioning the distributed singular partially encrypted SDV content encrypted via the one encryption system type to the fully encrypted SDV content encrypted via the one encryption system type. In certain implementations, the method further involves identifying, for each increase in the number of the encryption system types, an audio/video (A/V) content encrypting device that encrypts SDV content using the encryption system type associated with the increase in the number of the encryption system types; and the method of encrypting the SDV content associated with the particular SDV content selection as either the encrypted SDV content or the multiply partially encrypted SDV content based upon the determined number of encryption system types beginning from the current play location indicated for the SDV content selection within the EPG involves configuring the A/V content encrypting device to either fully encrypt the SDV content or to partially encrypt the SDV content. In certain implementations, the method of encrypting SDV content associated with the particular SDV content selection as either encrypted SDV content or multiply partially encrypted SDV content based upon the determined number of encryption system types beginning from the current play location indicated for the SDV content selection within the EPG involves merging, in response to encrypting SDV content as the multiply partially encrypted SDV content, partially encrypted content encrypted via a plurality of audio/video (A/V) content encrypting devices to form the multiply partially encrypted SDV content. In certain implementations, the method of distributing either the encrypted SDV content or the multiply partially encrypted SDV content as part of the outgoing SDV content stream to the subscriber terminal devices currently requesting tuning to the particular SDV content selection involves sending, to each of the subscriber terminal devices, a tuning frequency at which an edge resource transmits either the encrypted SDV content or the multiply partially encrypted SDV content as part of the outgoing SDV content stream. In certain implementations, the method further involves, in response to a first subscriber terminal device requesting tuning to the particular SDV content selection, identifying one of a plurality of video servers that stores the requested SDV content; and configuring a routing matrix to route the requested SDV content from the one of the plurality of video servers that stores the requested SDV content to a first audio/video (A/V) content encrypting device associated with a first encryption system type associated with the first subscriber terminal device. In certain implementations, the method further involves, in response to a second subscriber terminal device requesting tuning to the particular SDV content selection that utilizes an encryption system type different from the first encryption system type, configuring the routing matrix to additionally route the requested SDV content from the one of the plurality of video servers that stores the requested SDV content to a second A/V content encrypting device associated with a second encryption system type associated with the second subscriber terminal device. In certain implementations, the method further involves identifying portions of the SDV content for partial encryption; and the method of encrypting the SDV content as multiply partially encrypted SDV content based upon the determined number of encryption system types beginning from the current play location indicated for the SDV content selection within the EPG involves instructing at least one audio/video (A/V) content encrypting device to encrypt the identified portions of the SDV content. In certain implementations, the identified portions of the SDV content include at least one of parallel program specific information (PSI) packets; duplicate program allocation table (PAT) packets; duplicate program map table (PMT) packets; duplicate network information table (NIT) packets; conditional access table (CAT) packets; entitlement management message (EMM) packets; and entitlement control message (ECM) packets.

In another implementation, a computer readable storage medium may store instructions which, when executed on one or more programmed processors, carry out a process of conserving bandwidth within a switched digital video (SDV) system involving determining a number of encryption system types utilized by subscriber terminal devices currently requesting tuning to a particular SDV content selection in response to each change in a number of the subscriber terminal devices requesting tuning to the particular SDV content selection; encrypting SDV content associated with the particular SDV content selection as either encrypted SDV content or multiply partially encrypted SDV content based upon the determined number of encryption system types beginning from a current play location indicated for the SDV content selection within an electronic program guide (EPG); and distributing either the encrypted SDV content or the multiply partially encrypted SDV content as part of an outgoing SDV content stream to the subscriber terminal devices currently requesting tuning to the particular SDV content selection.

An apparatus for conserving bandwidth within a switched digital video (SDV) system consistent with certain implementations has a memory that stores an electronic program guide (EPG); and a processor programmed to determine a number of encryption system types utilized by subscriber terminal devices currently requesting tuning to a particular SDV content selection in response to each change in a number of the subscriber terminal devices requesting tuning to the particular SDV content selection; encrypt SDV content associated with the particular SDV content selection as either encrypted SDV content or multiply partially encrypted SDV content based upon the determined number of encryption system types beginning from a current play location indicated for the SDV content selection within the EPG; and distribute either the encrypted SDV content or the multiply partially encrypted SDV content as part of an outgoing SDV content stream to the subscriber terminal devices currently requesting tuning to the particular SDV content selection.

In certain implementations, the processor, in being programmed to encrypt the SDV content associated with the particular SDV content selection as encrypted SDV content, is programmed to encrypt the SDV content as fully encrypted SDV content. In certain implementations, the processor, in being programmed to encrypt the SDV content associated with the particular SDV content selection as encrypted SDV content, is programmed to encrypt the SDV content as singular partially encrypted SDV content. In certain implementations, a first change in the number of subscriber terminal devices requesting tuning to the particular SDV content selection includes a change from zero subscriber terminal devices to one subscriber terminal device and the determined number of encryption system types includes one encryption system type; and the processor, in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, is programmed to encrypt the SDV content via the one encryption system type as one of fully encrypted SDV content and singular partially encrypted SDV content beginning from the current play location indicated for the SDV content selection within the EPG. In certain implementations, a second change in the number of subscriber terminal devices requesting tuning to the particular SDV content selection includes a change from the one subscriber terminal device to two subscriber terminal devices that each utilize a same encryption system type and the determined number of encryption system types includes one encryption system type; and the processor, in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, is programmed to continue encrypting the SDV content via the one encryption system type as the one of the fully encrypted SDV content and the singular partially encrypted SDV content beginning from the current play location indicated for the SDV content selection within the EPG. In certain implementations, a second change in the number of subscriber terminal devices requesting tuning to the particular SDV content selection includes a change from the one subscriber terminal device to two subscriber terminal devices that each utilize a different encryption system type and the determined number of encryption system types includes two encryption system types; and the processor, in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, is programmed to encrypt the SDV content via each of the two encryption system types as the multiply partially encrypted SDV content beginning from the current play location indicated for the SDV content selection within the EPG; and, in being programmed to distribute either the encrypted SDV content or the multiply partially encrypted SDV content as part of the outgoing SDV content stream to the subscriber terminal devices currently requesting tuning to the particular SDV content selection, is programmed to transition the distributed encrypted SDV content to the multiply partially encrypted SDV content encrypted via the each of the two encryption system types. In certain implementations, a third change in the number of subscriber terminal devices requesting tuning to the particular SDV content selection includes a change from the two subscriber terminal devices to three subscriber terminal devices that each utilize a different encryption system type and the determined number of encryption system types includes three encryption system types; and the processor, in being programmed to encrypt the SDV content associated with the particular SDV content selection as either the encrypted SDV content or the multiply partially encrypted SDV content based upon the determined number of different encryption system types beginning from the current play location indicated for the SDV content selection within the EPG, is programmed to encrypt the SDV content via each of the three encryption system types as the multiply partially encrypted SDV content beginning from the current play location indicated for the SDV content selection within the EPG; and, in being programmed to distribute either the encrypted SDV content or the multiply partially encrypted SDV content as part of the outgoing SDV content stream to the subscriber terminal devices currently requesting tuning to the particular SDV content selection, is programmed to transition the distributed multiply partially encrypted SDV content encrypted via the each of the two encryption system types to the multiply partially encrypted SDV content encrypted via the each of the three encryption system types. In certain implementations, one change in the number of subscriber terminal devices requesting tuning to the particular SDV content selection includes a change from a number of subscriber terminal devices utilizing two encryption system types to a number of subscriber terminal devices utilizing one encryption system type and the determined number of encryption system types includes one encryption system type; and the processor is further programmed to monitor a duration of time from the one change in the number of subscriber terminal devices requesting tuning to the particular SDV content selection to the number of subscriber terminal devices utilizing one encryption system type; and determine whether an encryption hysteresis interval that regulates transitioning between partial encryption and full encryption has expired based upon the monitored duration of time. In certain implementations, the processor, in being programmed to encrypt the SDV content associated with the particular SDV content selection as either the encrypted SDV content or the multiply partially encrypted SDV content based upon the determined number of different encryption system types beginning from the current play location indicated for the SDV content selection within the EPG, is programmed to encrypt the SDV content via the one encryption system type as singular partially encrypted SDV content beginning from the current play location indicated for the SDV content selection within the EPG in response to determining that the encryption hysteresis interval has not expired; and in being programmed to distribute either the encrypted SDV content or the multiply partially encrypted SDV content as part of the outgoing SDV content stream to the subscriber terminal devices currently requesting tuning to the particular SDV content selection, is programmed to transition the distributed multiply partially encrypted SDV content encrypted via each of the two encryption system types to singular partially encrypted SDV content encrypted via the one encryption system type. In certain implementations, the processor, in being programmed to encrypt the SDV content associated with the particular SDV content selection as either the encrypted SDV content or the multiply partially encrypted SDV content based upon the determined number of different encryption system types beginning from the current play location indicated for the SDV content selection within the EPG, is programmed to encrypt the SDV content via the one encryption system type as fully encrypted SDV content beginning from the current play location indicated for the SDV content selection within the EPG in response to determining that the encryption hysteresis interval has expired; and in being programmed to distribute either the encrypted SDV content or the multiply partially encrypted SDV content as part of the outgoing SDV content stream to the subscriber terminal devices currently requesting tuning to the particular SDV content selection, is programmed to transition the distributed singular partially encrypted SDV content encrypted via the one encryption system type to the fully encrypted SDV content encrypted via the one encryption system type. In certain implementations, the processor is further programmed to identify, for each increase in the number of the encryption system types, an audio/video (A/V) content encrypting device that encrypts SDV content using the encryption system type associated with the increase in the number of the encryption system types; and, in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, the processor is programmed to configure the A/V content encrypting device to either fully encrypt the SDV content or to partially encrypt the SDV content. In certain implementations, the processor, in being programmed to encrypt SDV content associated with the particular SDV content selection as either encrypted SDV content or multiply partially encrypted SDV content based upon the determined number of encryption system types beginning from the current play location indicated for the SDV content selection within the EPG, is programmed to merge, in response to encrypting SDV content as the multiply partially encrypted SDV content, partially encrypted content encrypted via a plurality of audio/video (A/V) content encrypting devices to form the multiply partially encrypted SDV content. In certain implementations, the processor, in being programmed to distribute either the encrypted SDV content or the multiply partially encrypted SDV content as part of the outgoing SDV content stream to the subscriber terminal devices currently requesting tuning to the particular SDV content selection, is programmed to send, to each of the subscriber terminal devices, a tuning frequency at which an edge resource transmits either the encrypted SDV content or the multiply partially encrypted SDV content as part of the outgoing SDV content stream. In certain implementations, the processor, in response to a first subscriber terminal device requesting tuning to the particular SDV content selection, is further programmed to identify one of a plurality of video servers that stores the requested SDV content; and configure a routing matrix to route the requested SDV content from the one of the plurality of video servers that stores the requested SDV content to a first audio/video (A/V) content encrypting device associated with a first encryption system type associated with the first subscriber terminal device. In certain implementations, the processor, in response to a second subscriber terminal device requesting tuning to the particular SDV content selection that utilizes an encryption system type different from the first encryption system type, is further programmed to configure the routing matrix to additionally route the requested SDV content from the one of the plurality of video servers that stores the requested SDV content to a second A/V content encrypting device associated with a second encryption system type associated with the second subscriber terminal device. In certain implementations, the processor is further programmed to identify portions of the SDV content for partial encryption; and, in being programmed to encrypt the SDV content as multiply partially encrypted SDV content based upon the determined number of encryption system types beginning from the current play location indicated for the SDV content selection within the EPG, the processor is programmed to instruct at least one audio/video (A/V) content encrypting device to encrypt the identified portions of the SDV content. In certain implementations, the identified portions of the SDV content include at least one of parallel program specific information (PSI) packets; duplicate program allocation table (PAT) packets; duplicate program map table (PMT) packets; duplicate network information table (NIT) packets; conditional access table (CAT) packets; entitlement management message (EMM) packets; and entitlement control message (ECM) packets.

In another implementation, a method of managing switched digital video (SDV) content in a SDV system supporting multiple conditional access systems involves always multiple partially encrypting content with each supported conditional access systems of the switched digital video (SDV) system regardless of a type of subscriber terminal devices currently requesting tuning to a particular SDV content selection within the SDV system.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of conserving bandwidth within a switched digital video (SDV) system, comprising:
   determining, via a SDV processing module, a number of encryption system types utilized by subscriber terminal devices currently requesting tuning to a particular SDV content selection in response to each change in a number of the subscriber terminal devices requesting tuning to the particular SDV content selection, where:
      a first change in the number of the subscriber terminal devices requesting tuning to the particular SDV content selection comprises a change from zero subscriber terminal devices to one subscriber terminal device and the determined number of encryption system types comprises one encryption system type; and
      a second change in the number of the subscriber terminal devices requesting tuning to the particular SDV content selection comprises a change from the one subscriber terminal device to two subscriber terminal devices that each utilize a different encryption system type and the determined number of encryption system types comprises two encryption system types;
   encrypting SDV content associated with the particular SDV content selection as one of fully encrypted SDV content and singular partially encrypted SDV content in response to the first change in the number of the subscriber terminal devices requesting tuning to the particular SDV content selection and as multiply partially encrypted SDV content in response to the second change in the number of the subscriber terminal devices requesting tuning to the particular SDV content selection based upon the determined number of encryption system types beginning from a current play location indicated for the SDV content selection within an electronic program guide (EPG);
   where encrypting the SDV content via the one encryption system type as singular partially encrypted SDV content beginning from the current play location indicated for the SDV content selection within the EPG is in response to determining that a encryption hysteresis interval has not expired;
   transitioning the distributed multiply partially encrypted SDV content encrypted via each of the two encryption system types to singular partially encrypted SDV content encrypted via the one encryption system type; and distributing the one of the fully encrypted SDV content and the singular partially encrypted SDV content in response to the first change in the number of the subscriber terminal devices requesting tuning to the particular SDV content selection and the multiply partially encrypted SDV content in response to the second change in the number of the subscriber terminal devices requesting tuning to the particular SDV content selection as part of an outgoing SDV content stream to the subscriber terminal devices currently requesting tuning to the particular SDV content selection.

2. A method of conserving bandwidth within a switched digital video (SDV) system, comprising:

determining, via an SDV processing module, a number of encryption system types utilized by subscriber terminal devices currently requesting tuning to a particular SDV content selection in response to each change in a number of the subscriber terminal devices requesting tuning to the particular SDV content selection;

encrypting SDV content associated with the particular SDV content selection as either encrypted SDV content or multiply partially encrypted SDV content based upon the determined number of encryption system types beginning from a current play location indicated for the SDV content selection within an electronic program guide (EPG);

distributing either the encrypted SDV content or the multiply partially encrypted SDV content as part of an outgoing SDV content stream to the subscriber terminal devices currently requesting tuning to the particular SDV content selection; and where one change in the number of subscriber terminal devices requesting tuning to the particular SDV content selection comprises a change from a number of subscriber terminal devices utilizing two encryption system types to a number of subscriber terminal devices utilizing one encryption system type and the determined number of encryption system types comprises one encryption system type; and further comprising:

monitoring a duration of time from the one change in the number of subscriber terminal devices requesting tuning to the particular SDV content selection to the number of subscriber terminal devices utilizing one encryption system type; and determining whether an encryption hysteresis interval that regulates transitioning between partial encryption and full encryption has expired based upon the monitored duration of time.

3. The method according to claim 2, where encrypting the SDV content associated with the particular SDV content selection as the encrypted SDV content comprises encrypting the SDV content as fully encrypted SDV content.

4. The method according to claim 2, where encrypting the SDV content associated with the particular SDV content selection as the encrypted SDV content comprises encrypting the SDV content as singular partially encrypted SDV content.

5. The method according to claim 2, where:

a first change in the number of subscriber terminal devices requesting tuning to the particular SDV content selection comprises a change from zero subscriber terminal devices to one subscriber terminal device and the determined number of encryption system types comprises one encryption system type; and encrypting the SDV content associated with the particular SDV content selection as either the encrypted SDV content or the multiply partially encrypted SDV content based upon the determined number of encryption system types beginning from the current play location indicated for the SDV content selection within the EPG comprises encrypting the SDV content via the one encryption system type as one of fully encrypted SDV content and singular partially encrypted SDV content beginning from the current play location indicated for the SDV content selection within the EPG.

6. The method according to claim 5, where:

a second change in the number of subscriber terminal devices requesting tuning to the particular SDV content selection comprises a change from the one subscriber terminal device to two subscriber terminal devices that each utilize a same encryption system type and the determined number of encryption system types comprises one encryption system type; and encrypting the SDV content associated with the particular SDV content selection as either the encrypted SDV content or the multiply partially encrypted SDV content based upon the determined number of encryption system types beginning from the current play location indicated for the SDV content selection within the EPG comprises continuing encrypting the SDV content via the one encryption system type as the one of the fully encrypted SDV content and the singular partially encrypted SDV content beginning from the current play location indicated for the SDV content selection within the EPG.

7. The method according to claim 2, where:

encrypting the SDV content associated with the particular SDV content selection as either the encrypted SDV content or the multiply partially encrypted SDV content based upon the determined number of different encryption system types beginning from the current play location indicated for the SDV content selection within the EPG comprises:

encrypting the SDV content via the one encryption system type as singular partially encrypted SDV content beginning from the current play location indicated for the SDV content selection within the EPG in response to determining that the encryption hysteresis interval has not expired; and distributing either the encrypted SDV content or the multiply partially encrypted SDV content as part of the outgoing SDV content stream to the subscriber terminal devices currently requesting tuning to the particular SDV content selection comprises:

transitioning the distributed multiply partially encrypted SDV content encrypted via each of the two encryption system types to singular partially encrypted SDV content encrypted via the one encryption system type.

8. The method according to claim 7, where:

encrypting the SDV content associated with the particular SDV content selection as either the encrypted SDV content or the multiply partially encrypted SDV content based upon the determined number of different encryption system types beginning from the current play location indicated for the SDV content selection within the EPG comprises:

encrypting the SDV content via the one encryption system type as fully encrypted SDV content beginning from the current play location indicated for the SDV content selection within the EPG in response to determining that the encryption hysteresis interval has expired; and distributing either the encrypted SDV content or the multiply partially encrypted SDV content as part of the outgoing SDV content stream to the subscriber terminal devices currently requesting tuning to the particular SDV content selection comprises:
   transitioning the distributed singular partially encrypted SDV content encrypted via the one encryption system type to the fully encrypted SDV content encrypted via the one encryption system type.

9. The method according to claim 2, further comprising:
identifying, for each increase in the number of the encryption system types, an audio/video (A/V) content encrypting device that encrypts SDV content using the encryption system type associated with the increase in the number of the encryption system types; and
where encrypting the SDV content associated with the particular SDV content selection as either the encrypted SDV content or the multiply partially encrypted SDV content based upon the determined number of encryption system types beginning from the current play location indicated for the SDV content selection within the EPG comprises configuring the A/V content encrypting device to either fully encrypt the SDV content or to partially encrypt the SDV content.

10. The method according to claim 2, where encrypting SDV content associated with the particular SDV content selection as either encrypted SDV content or multiply partially encrypted SDV content based upon the determined number of encryption system types beginning from the current play location indicated for the SDV content selection within the EPG comprises:
   merging, in response to encrypting SDV content as the multiply partially encrypted SDV content, partially encrypted content encrypted via a plurality of audio/video (A/V) content encrypting devices to form the multiply partially encrypted SDV content.

11. The method according to claim 2, where distributing either the encrypted SDV content or the multiply partially encrypted SDV content as part of the outgoing SDV content stream to the subscriber terminal devices currently requesting tuning to the particular SDV content selection comprises sending, to each of the subscriber terminal devices, a tuning frequency at which an edge resource transmits either the encrypted SDV content or the multiply partially encrypted SDV content as part of the outgoing SDV content stream.

12. The method according to claim 2, further comprising:
in response to a first subscriber terminal device requesting tuning to the particular SDV content selection:
   identifying one of a plurality of video servers that stores the requested SDV content; and
   configuring a routing matrix to route the requested SDV content from the one of the plurality of video servers that stores the requested SDV content to a first audio/video (A/V) content encrypting device associated with a first encryption system type associated with the first subscriber terminal device.

13. The method according to claim 12, further comprising:
in response to a second subscriber terminal device requesting tuning to the particular SDV content selection that utilizes an encryption system type different from the first encryption system type:
   configuring the routing matrix to additionally route the requested SDV content from the one of the plurality of video servers that stores the requested SDV content to a second A/V content encrypting device associated with a second encryption system type associated with the second subscriber terminal device.

14. The method according to claim 2, further comprising:
identifying portions of the SDV content for partial encryption; and
where encrypting the SDV content as multiply partially encrypted SDV content based upon the determined number of encryption system types beginning from the current play location indicated for the SDV content selection within the EPG comprises instructing at least one audio/video (A/V) content encrypting device to encrypt the identified portions of the SDV content.

15. An apparatus for conserving bandwidth within a switched digital video (SDV) system, comprising:
   a memory that stores an electronic program guide (EPG); and
   a processor programmed to:
      determine a number of encryption system types utilized by subscriber terminal devices currently requesting tuning to a particular SDV content selection in response to each change in a number of the subscriber terminal devices requesting tuning to the particular SDV content selection;
      encrypt SDV content associated with the particular SDV content selection as either encrypted SDV content or multiply partially encrypted SDV content based upon the determined number of encryption system types beginning from a current play location indicated for the SDV content selection within the EPG;
      distribute either the encrypted SDV content or the multiply partially encrypted SDV content as part of an outgoing SDV content stream to the subscriber terminal devices currently requesting tuning to the particular SDV content selection;
   where a first change in the number of subscriber terminal devices requesting tuning to the particular SDV content selection comprises a change from zero subscriber terminal devices to one subscriber terminal device and the determined number of encryption system types comprises one encryption system type;
   where in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, the processor is programmed to encrypt the SDV content via the one encryption system type as one of fully encrypted SDV content and singular partially encrypted SDV content beginning from the current play location indicated for the SDV content selection within the EPG;
   where a second change in the number of subscriber terminal devices requesting tuning to the particular SDV content selection comprises a change from the one subscriber terminal device to two subscriber terminal devices that each utilize a same encryption system type and the determined number of encryption system types comprises one encryption system type;
   where in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, the processor is programmed to continue encrypting the SDV content via the one encryption system type as the one of the fully encrypted SDV content and the singular partially encrypted SDV content beginning from the current play location indicated for the SDV content selection within the EPG;
where a second change in the number of subscriber terminal devices requesting tuning to the particular SDV content selection comprises a change from the one subscriber terminal device to two subscriber terminal devices that each utilize a different encryption system type and the determined number of encryption system types comprises two encryption system types;
where in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, the processor is programmed to encrypt the SDV content via each of the two encryption system types as the multiply partially encrypted SDV content beginning from the current play location indicated for the SDV content selection within the EPG; and
where in being programmed to distribute either the encrypted SDV content or the multiply partially encrypted SDV content as part of the outgoing SDV content stream to the subscriber terminal devices currently requesting tuning to the particular SDV content selection, the processor is programmed to transition the distributed encrypted SDV content to the multiply partially encrypted SDV content encrypted via the each of the two encryption system types.

16. The apparatus according to claim 15, where, in being programmed to encrypt the SDV content associated with the particular SDV content selection as encrypted SDV content, the processor is programmed to encrypt the SDV content as fully encrypted SDV content.

17. The apparatus according to claim 15, where, in being programmed to encrypt the SDV content associated with the particular SDV content selection as encrypted SDV content, the processor is programmed to encrypt the SDV content as singular partially encrypted SDV content.

18. The apparatus according to claim 15, where:
a third change in the number of subscriber terminal devices requesting tuning to the particular SDV content selection comprises a change from the two subscriber terminal devices to three subscriber terminal devices that each utilize a different encryption system type and the determined number of encryption system types comprises three encryption system types; and
in being programmed to encrypt the SDV content associated with the particular SDV content selection as either the encrypted SDV content or the multiply partially encrypted SDV content based upon the determined number of different encryption system types beginning from the current play location indicated for the SDV content selection within the EPG, the processor is programmed to encrypt the SDV content via each of the three encryption system types as the multiply partially encrypted SDV content beginning from the current play location indicated for the SDV content selection within the EPG; and
in being programmed to distribute either the encrypted SDV content or the multiply partially encrypted SDV content as part of the outgoing SDV content stream to the subscriber terminal devices currently requesting tuning to the particular SDV content selection, the processor is programmed to transition the distributed multiply partially encrypted SDV content encrypted via the each of the two encryption system types to the multiply partially encrypted SDV content encrypted via the each of the three encryption system types.

19. An apparatus for conserving bandwidth within a switched digital video (SDV) system, comprising:
a memory that stores an electronic program guide (EPG); and
a processor programmed to:
determine a number of encryption system types utilized by subscriber terminal devices currently requesting tuning to a particular SDV content selection in response to each change in a number of the subscriber terminal devices requesting tuning to the particular SDV content selection;
encrypt SDV content associated with the particular SDV content selection as either encrypted SDV content or multiply partially encrypted SDV content based upon the determined number of encryption system types beginning from a current play location indicated for the SDV content selection within the EPG; and
distribute either the encrypted SDV content or the multiply partially encrypted SDV content as part of an outgoing SDV content stream to the subscriber terminal devices currently requesting tuning to the particular SDV content selection;
where one change in the number of subscriber terminal devices requesting tuning to the particular SDV content selection comprises a change from a number of subscriber terminal devices utilizing two encryption system types to a number of subscriber terminal devices utilizing one encryption system type and the determined number of encryption system types comprises one encryption system type; and
the processor is further programmed to:
monitor a duration of time from the one change in the number of subscriber terminal devices requesting tuning to the particular SDV content selection to the number of subscriber terminal devices utilizing one encryption system type; and
determine whether an encryption hysteresis interval that regulates transitioning between partial encryption and full encryption has expired based upon the monitored duration of time.

20. An apparatus for conserving bandwidth within a switched digital video (SDV) system, comprising:
a memory that stores an electronic program guide (EPG); and
a processor programmed to:
determine a number of encryption system types utilized by subscriber terminal devices currently requesting tuning to a particular SDV content selection in response to each change in a number of the subscriber terminal devices requesting tuning to the particular SDV content selection;
encrypt SDV content associated with the particular SDV content selection as either encrypted SDV content or multiply partially encrypted SDV content based upon the determined number of encryption system types beginning from a current play location indicated for the SDV content selection within the EPG; and
distribute either the encrypted SDV content or the multiply partially encrypted SDV content as part of an outgoing SDV content stream to the subscriber terminal devices currently requesting tuning to the particular SDV content selection;

where in being programmed to encrypt the SDV content associated with the particular SDV content selection as either the encrypted SDV content or the multiply partially encrypted SDV content based upon the determined number of different encryption system types beginning from the current play location indicated for the SDV content selection within the EPG, the processor is programmed to:

encrypt the SDV content via the one encryption system type as singular partially encrypted SDV content beginning from the current play location indicated for the SDV content selection within the EPG in response to determining that the encryption hysteresis interval has not expired; and in being programmed to distribute either the encrypted SDV content or the multiply partially encrypted SDV content as part of the outgoing SDV content stream to the subscriber terminal devices currently requesting tuning to the particular SDV content selection, the processor is programmed to:

transition the distributed multiply partially encrypted SDV content encrypted via each of the two encryption system types to singular partially encrypted SDV content encrypted via the one encryption system type.

21. The apparatus according to claim 15, where the processor is further programmed to:

identify, for each increase in the number of the encryption system types, an audio/video (A/V) content encrypting device that encrypts SDV content using the encryption system type associated with the increase in the number of the encryption system types; and where, in being programmed to encrypt the SDV content associated with the particular SDV content selection as either the encrypted SDV content or the multiply partially encrypted SDV content based upon the determined number of encryption system types beginning from the current play location indicated for the SDV content selection within the EPG, the processor is programmed to configure the A/V content encrypting device to either fully encrypt the SDV content or to partially encrypt the SDV content.

22. The apparatus according to claim 15, where, in being programmed to distribute either the encrypted SDV content or the multiply partially encrypted SDV content as part of the outgoing SDV content stream to the subscriber terminal devices currently requesting tuning to the particular SDV content selection, the processor is programmed to send, to each of the subscriber terminal devices, a tuning frequency at which an edge resource transmits either the encrypted SDV content or the multiply partially encrypted SDV content as part of the outgoing SDV content stream.

23. The apparatus according to claim 15, where, in response to a first subscriber terminal device requesting tuning to the particular SDV content selection, the processor is further programmed to:

identify one of a plurality of video servers that stores the requested SDV content; and configure a routing matrix to route the requested SDV content from the one of the plurality of video servers that stores the requested SDV content to a first audio/video (A/V) content encrypting device associated with a first encryption system type associated with the first subscriber terminal device.

24. The apparatus according to claim 23, where the processor is further programmed to:

in response to a second subscriber terminal device requesting tuning to the particular SDV content selection that utilizes an encryption system type different from the first encryption system type:

configure the routing matrix to additionally route the requested SDV content from the one of the plurality of video servers that stores the requested SDV content to a second A/V content encrypting device associated with a second encryption system type associated with the second subscriber terminal device.

25. The apparatus according to claim 15, where the processor is further programmed to:

identify portions of the SDV content for partial encryption; and where, in being programmed to encrypt the SDV content as multiply partially encrypted SDV content based upon the determined number of encryption system types beginning from the current play location indicated for the SDV content selection within the EPG, the processor is programmed to instruct at least one audio/video (A/V) content encrypting device to encrypt the identified portions of the SDV content.

\* \* \* \* \*